US012670348B2

(12) United States Patent
Decoux et al.

(10) Patent No.: US 12,670,348 B2
(45) Date of Patent: Jun. 30, 2026

(54) SECURITY ELEMENT, CORRESPONDING ENGRAVED INTAGLIO PRINTING PLATE, AND METHODS AND DEVICES FOR PRODUCING, DECODING AND AUTHENTICATING SECURITY MARKING OF SAID SECURITY ELEMENT

(71) Applicant: SICPA HOLDING SA, Prilly (CH)

(72) Inventors: Eric Decoux, Vevey (CH); Olivier Lefebvre, Montagny-près-Yverdon (CH); Nicola Duca, Monthey (CH)

(73) Assignee: SICPA HOLDING SA, Prilly (CH)

( * ) Notice: Subject to any disclaimer, the term of this patent is extended or adjusted under 35 U.S.C. 154(b) by 113 days.

(21) Appl. No.: 18/722,363

(22) PCT Filed: Dec. 16, 2022

(86) PCT No.: PCT/EP2022/086372
§ 371 (c)(1),
(2) Date: Jun. 20, 2024

(87) PCT Pub. No.: WO2023/117765
PCT Pub. Date: Jun. 29, 2023

(65) Prior Publication Data
US 2025/0061297 A1 Feb. 20, 2025

(30) Foreign Application Priority Data
Dec. 20, 2021 (EP) ..................................... 21216149

(51) Int. Cl.
*G06K 7/14* (2006.01)
*B41C 1/04* (2006.01)
(Continued)

(52) U.S. Cl.
CPC .............. *G06K 7/1417* (2013.01); *B41C 1/04* (2013.01); *B41M 1/10* (2013.01); *B41M 3/14* (2013.01);
(Continued)

(58) Field of Classification Search
CPC .......... G06K 7/1417; G06K 19/06037; G06K 19/06103; B41C 1/04; B41M 1/10;
(Continued)

(56) References Cited

U.S. PATENT DOCUMENTS

| | | | |
|---|---|---|---|
| 6,153,123 | A | 11/2000 | Hampden-Smith et al. |
| 6,180,029 | B1 | 1/2001 | Hampden-Smith et al. |

(Continued)

FOREIGN PATENT DOCUMENTS

| | | | | |
|---|---|---|---|---|
| CA | 2812286 A1 | * | 3/2012 | ....... G06K 19/06037 |
| EP | 0985007 | | 5/2006 | |

(Continued)

OTHER PUBLICATIONS

Van Renesse Rudolf L.: "Intaglio Printing" In: "Optical Document Security", 2005, Artech House, Boston, Mass. [u.a.], XP055901969, pp. 115-120.

(Continued)

*Primary Examiner* — Sonji N Johnson
(74) *Attorney, Agent, or Firm* — MUNCY, GEISSLER, OLDS & LOWE, P.C.

(57) ABSTRACT

The invention relates to a security marking printed via intaglio process. The security marking includes multitone 2D intaglio patterns of intaglio modules containing encoded data according to specific encoding symbols. The decoding of the symbols, together with measured tone values for tiny shifts around their positions at decoding stage on a digital image of the intaglio patterns in correlation with the symbols, provides a robust and precise estimation of a register (Continued)

error between modules of distinct tones, thus allowing to easily detect any fake marking obtained via offset printing, even with a smartphone.

15 Claims, 18 Drawing Sheets

(51) Int. Cl.

| | | |
|---|---|---|
| *B41M 1/10* | (2006.01) | |
| *B41M 3/14* | (2006.01) | |
| *B41N 1/06* | (2006.01) | |
| *B42D 25/305* | (2014.01) | |
| *B42D 25/324* | (2014.01) | |
| *G06K 19/06* | (2006.01) | |

(52) U.S. Cl.
CPC ............. *B41N 1/06* (2013.01); *B42D 25/305* (2014.10); *B42D 25/324* (2014.10); *G06K 19/06037* (2013.01); *G06K 19/06103* (2013.01)

(58) Field of Classification Search
CPC .......... B41M 3/14; B41N 1/06; B42D 25/305; B42D 25/324; B42D 25/24; B42D 25/29; G07D 7/005; G07D 7/206
See application file for complete search history.

(56) References Cited

U.S. PATENT DOCUMENTS

| | | | |
|---|---|---|---|
| 6,565,770 | B1 | 5/2003 | Mayer et al. |
| 7,108,742 | B2 | 9/2006 | Hall-Goulle et al. |
| 2006/0083694 | A1 | 4/2006 | Kodas et al. |
| 2016/0068702 | A1* | 3/2016 | Lin ........................... C09D 5/28 524/502 |
| 2020/0294342 | A1 | 9/2020 | Ronayne, Jr. et al. |
| 2022/0363083 | A1* | 11/2022 | Chassot .................. B41F 9/002 |

FOREIGN PATENT DOCUMENTS

| | | |
|---|---|---|
| EP | 1844929 | 10/2007 |
| EP | 2619714 | 8/2015 |
| EP | 2780865 | 3/2017 |
| EP | 2956514 | 5/2018 |
| EP | 3068728 | 8/2018 |
| WO | 1998036888 | 8/1998 |
| WO | 2007060133 | 5/2007 |
| WO | 2007132214 | 11/2007 |
| WO | 2008033059 | 3/2008 |
| WO | 2008092522 | 8/2008 |
| WO | 2009005733 | 1/2009 |
| WO | 2010115986 | 10/2010 |
| WO | 2011002960 | 1/2011 |
| WO | 2011041657 | 4/2011 |
| WO | 2012160182 | 11/2012 |
| WO | 2013068275 | 5/2013 |
| WO | 2013079521 | 6/2013 |
| WO | 2014083145 | 6/2014 |
| WO | 2016005158 | 1/2016 |
| WO | 2018178021 | 10/2018 |
| WO | 2019219250 | 11/2019 |

OTHER PUBLICATIONS

Kipphan Helmut: "Raster and Intaglio" In: "Handbuch der Printmedien: Technologien und Produktionsverfahren; mit 85 Tabellen", 2000, Springer Verlag, Berlin Heidelberg New York, XP055901972, pp. 25-540; pp. 25-28; pp. 49-53; pp. 92-102; p. 402; pp. 522-540.
International Search Report and Written Opinion issued with respect to application No. PCT/EP2022/086372.

* cited by examiner

100

210

220

205

600

610

615

SECURITY ELEMENT, CORRESPONDING ENGRAVED INTAGLIO PRINTING PLATE, AND METHODS AND DEVICES FOR PRODUCING, DECODING AND AUTHENTICATING SECURITY MARKING OF SAID SECURITY ELEMENT

TECHNICAL FIELD

The present invention relates to the technical field of two-dimensional multicolor patterns printed by an intaglio process intaglio on security documents (e.g. banknotes, passports), stamps or tickets, via intaglio printing with multitone intaglio inks (see e.g. the patent EP 2 956 514 B1) to provide protection against their counterfeit or illegal reproduction. The invention further relates to the technical field of encoding/decoding and authenticating methods of two-dimensional encoded patterns (see e.g. the patents EP 2 619 714 B1 or EP 2 780 865 B1).

BACKGROUND OF THE INVENTION

Security markings containing two-dimensional patterns printed by intaglio processes with thin intaglio lines, possibly of different colors or different tones of a same color (e.g. half-tone intaglio patterns) are widely used as a protection against their illegal reproduction due to the great difficulty to produce copies without registration errors.

Intaglio printing delivers the most consistent and high quality printing of fine lines. It can be considered as the printing technology of choice for generating fine designs in the field of security documents, in particular banknotes and stamps. One of the distinguishing features of the intaglio printing process is that intaglio reliefs may be varied from a few micrometers to several tens of micrometers by using correspondingly shallow or respectively deep recesses of the intaglio printing plate. Intaglio relief resulting from the intaglio ink layer thickness is emphasized by the embossing of the substrate, said embossing being produced by the pressure during the ink transfer. The tactility resulting from intaglio printing gives the banknotes their typical and recognizable touch feeling.

It is known in the art that intaglio inks may be used to produce multitone designs, i.e. by printing a single intaglio ink in a single step process, it is possible to produce printed designs comprising several different color shades as result of the different printed ink thickness resulting from the different intaglio plate engravings depths. The patent EP 2 956 514 B1 discloses an intaglio ink composition suitable to print multi-characteristic intaglio printed design in a predictable manner. The intaglio ink composition disclosed in EP 2 956 514 B1 comprise two components being pigment particles of different modal particle diameter.

In case the intaglio printing of a pattern (i.e. "intaglio pattern") is realized in only one color, a commonly used technique for copying said pattern is the offset printing technique. In this case there is indeed no registration error on the generally high quality copy so that its visual appearance is misleading, but of course the specific tactile perception provided by a relief feature of an intaglio printed pattern is lost. This is one of reasons why many banknotes in the world contain intaglio security features.

In case of an intaglio pattern in multitone or multicolor, the offset printing technique cannot provide a copy without registration errors (due to the multiple offset steps and printing plates), and the more colorful the worst it is. However, when the offset printing is performed with great care, these registration errors can be hardly perceptible to the human naked eye or the man in the street and necessitate specific analytical tools (e.g. magnifying lens, microscope) that are not commonly available.

Thus, there is a need for security intaglio patterns of which counterfeit or illegal reproduction, even with sophisticated offset printing techniques, could be easily detectable by commonly available means capable to take a mere digital image of a pattern, like for example a smartphone equipped with a camera, even if the camera of the smartphone has a quite low resolving power.

SUMMARY OF THE INVENTION

In order to overcome the above mentioned drawbacks and limitations of the prior art, a security marking involving both multitone intaglio printing of patterns and encoding of said patterns according to highly secure encoding schemes, for example such as the ones specified into the above cited patents EP 2 619 714 B1 or EP 2 780 865 B1, has been developed according to the invention.

Specifically, the patent EP 2 780 865 B1 discloses a pattern for coding a numerical information item on a surface, comprising a specific arrangement of a plurality of symbols belonging to a set of symbols, each symbol in the arrangement being intended for the coding of a portion of said numerical information item, wherein each symbol consists of at least one differential pair of elements positioned in a specific way, each element including a parameter, the parameter of the first element of each differential pair having a first value and the parameter of the second element of each differential pair having a second value different from the first value, and said specific arrangement corresponds to a predetermined arrangement of said symbols constituting a reference pattern.

Moreover, corresponding methods and devices for producing, encoding or decoding, and authenticating (via commonly available means) said security marking have also been developed according to the invention, so that any counterfeited reproduction can be easily detected by everyone.

With alternative printing processes such as e.g. offset, silkscreen, gravure or inkjet, the use of different colored inks is mandatory to produce designs comprising three or more colors. However, these printing processes are not suitable to provide the requested resolution and/or register for the different colors of the security marking of the invention. Thus, these printing processes cannot be used to produce multitone security features comprising multitone security patterns as disclosed herein. Should these alternative printing processes be used in an attempt to reproduce the security marking as disclosed herein on a value document, the authentication according to the invention of the copy would fail and the corresponding printed security document would be identified as being a counterfeit.

A security element according to a first aspect of the invention comprises a substrate and a security marking, the security marking comprising a two-dimensional intaglio pattern printed on a surface of the substrate via intaglio printing with intaglio ink, the two-dimensional intaglio pattern having an associated color and comprising at least one base intaglio pattern comprising a plurality of intaglio modules, each base intaglio pattern only comprises intaglio modules of which tones belong to a corresponding set of two distinct allowed tones, each intaglio module having one tone of said associated color, a tone of an intaglio module being selected from a tone palette of a plurality of distinct reference tones of the associated color, a CIE color difference $\Delta E^*$ between the tones being greater than or equal to 2.0, a width $\varepsilon$ of an intaglio module being greater than 20 μm and less than or equal to 50 μm, wherein the two-dimensional intaglio pattern is produced based on an associated two-dimensional encoded pattern comprising at least one reference pattern, wherein each of the at least one base intaglio pattern is based on an associated reference pattern of the at least one reference pattern, each base intaglio pattern and an associated reference pattern encoding a same portion of information, which specifies a unique identification number of the associated reference pattern, wherein each reference pattern includes a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2, wherein each reference pattern only comprises dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones, wherein each intaglio module of each base intaglio pattern of the two-dimensional intaglio pattern is printed either as a separate intaglio module corresponding to a first element of a symbol of an associated reference pattern of the two-dimensional encoded pattern and its location in the reference pattern; or as a portion of an intaglio line corresponding to a line connecting two first elements having a same parameter value p, respectively belonging to two distinct adjacent symbols of an associated reference pattern of the two-dimensional encoded pattern, and a location of the line in the reference pattern.

An intaglio module may be printed separated from another neighboring intaglio module, or may be a portion of (thin) intaglio line that can be connected to another portion of intaglio line of a neighboring intaglio module so as to form a continuous path.

The above security marking, may comprise a plurality of two-dimensional intaglio patterns, each two-dimensional intaglio pattern having a corresponding associated color from a color palette, any color of the color palette being distinct from a background color of the substrate.

Preferably, the security element comprises a plurality of two-dimensional intaglio patterns, each two-dimensional intaglio pattern having a corresponding associated color being distinct from a background color of the substrate Preferably, a two-dimensional intaglio pattern of the above security marking is comprised in a cell having a boundary formed by intaglio lines of which height is greater than any height of the intaglio modules of said two-dimensional intaglio pattern, a distance between an edge of the two-dimensional intaglio pattern and the boundary of the cell being greater than or equal to 40 μm.

More preferably, the CIE color difference $\Delta E^*$ between the tones is greater than or equal to 2.5.

According to a second aspect, the invention relates to an engraved plate for an intaglio printing machine, comprising grooves of variable engraving depth adapted to receive intaglio ink to print on a surface of a substrate a two-dimensional intaglio pattern of a security marking of a security element as specified above.

Thus, the above engraved plate allows to print on the surface of the substrate the intaglio pattern having a color of the intaglio ink and comprising a plurality of intaglio modules forming a specific pattern of intaglio lines, each intaglio module having a tone of said color, a tone of an intaglio module of a plurality of distinct reference tones of the color ranging from a darker tone to a lighter tone, a CIE color difference $\Delta E^*$ between the tones being greater than or equal to 2.0, and allows to print the two-dimensional intaglio pattern on the surface of the substrate in which a width $\varepsilon$ of an intaglio line is greater than 20 μm and less than or equal to 50 μm.

In fact, the engraved plate variable engraving depth is adapted to produce intaglio modules such that an intaglio module of the two-dimensional intaglio pattern either corresponds to:

a first element of a symbol of a reference pattern of the two-dimensional encoded pattern; or constitutes a portion of an intaglio line corresponding to a line connecting two elements having a same positive parameter value p, respectively belonging to two distinct adjacent symbols of a reference pattern of the two-dimensional encoded pattern.

According to a third aspect, the invention also relates to a corresponding method of producing a security element comprising a security marking comprising a two-dimensional intaglio pattern according to any one of claims 1 to 4, the method comprising the steps of:

(i) generating a two-dimensional encoded pattern comprising at least one reference pattern by encoding a portion of information into each of said at least one reference pattern forming the two-dimensional encoded pattern, said portion of information specifying for each reference pattern its unique identification number, each reference pattern including a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2, wherein each reference pattern only comprises dark symbols and light symbols, the parameter value of the first element of a dark symbol corresponding to a darker tone of an associated pair of allowed tones, selected from a tone palette of a plurality of distinct reference tones of a color associated with the two-dimensional encoded pattern, and the parameter value of the first element of a light symbol corresponding to the lighter tone of said associated pair of allowed tones, wherein the two-dimensional intaglio pattern to be produced is based on the generated two-dimensional encoded pattern and comprising at least one base intaglio pattern comprising a plurality of intaglio modules, each intaglio module having one tone of said associated color, a tone of an intaglio module being selected from the tone palette, wherein each of the at least one base intaglio pattern is based on an associated reference pattern of the at least one reference pattern, each base intaglio pattern encoding a same portion of information than an associated reference pattern, wherein each base intaglio pattern only comprising intaglio modules of which tones belong to the pair of allowed tones of the associated reference pattern, and each intaglio module of each base intaglio pattern of the two-dimensional intaglio pattern is to be printed either as a separate intaglio module corresponding to a first element of a symbol of an associated reference pattern of the two-dimensional encoded pattern and its location in the reference pattern; or as a portion of an intaglio line corresponding to a line connecting two first elements having a same parameter value p, respectively belonging to two distinct adjacent symbols of an associated reference pattern of the two-dimensional encoded pattern, and a location of the line in the reference pattern;

(ii) engraving a plate of an intaglio printing machine with variable engraving depth adapted to receive an intaglio ink of said color and to reproduce the intaglio modules of the two-dimensional intaglio pattern according to the generated two-dimensional encoded pattern; and (iii) inking the plate with the intaglio ink and using the inked plate with the intaglio printing machine to print on a surface of a substrate the corresponding two-dimensional intaglio pattern.

According to a corresponding fourth aspect, the invention relates to a method of decoding information encoded into a two-dimensional intaglio pattern of a security marking of a security element, the two-dimensional intaglio pattern comprising at least one base intaglio pattern comprising a plurality of intaglio modules, the method comprising the steps of:

imaging the two-dimensional intaglio pattern;

detecting, from the imaged intaglio modules of the imaged two-dimensional intaglio pattern, any reference pattern of at least one reference pattern forming a two-dimensional encoded pattern based on which a corresponding genuine two-dimensional intaglio pattern of a genuine security marking of a genuine security element according to any one of claims 1 to 4 was produced;

decoding each detected reference pattern and retrieving corresponding decoded information of the two-dimensional encoded pattern; and validating each decoded reference pattern and corresponding base intaglio pattern.

Preferably, the above method of decoding information may comprise the steps of:

a) imaging the two-dimensional intaglio pattern of the security marking with a camera, equipped with a processor and a memory, of which light sensor is adapted to detect a color of intaglio modules forming the genuine intaglio pattern and distinct tones of the tone palette of said color, to obtain a digital image of the two-dimensional intaglio pattern and store the obtained digital image in the memory, the memory storing a set of associated reference patterns and, for each stored reference pattern, the portion of information specifying a corresponding reference pattern identification number;

each stored reference pattern including a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2;

each pair of allowed tones of intaglio modules of each base intaglio pattern being associated with a corresponding base intaglio pattern and stored in the memory in association with the reference pattern identification number of the reference pattern associated with said base intaglio pattern;

each stored reference pattern only comprising dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones; b) detecting in the stored digital image, via image processing of the pixels of the digital image scanned with the processor through a movable window of a size of a reference pattern, intaglio modules within the window, and b1) checking whether each of said detected intaglio modules, for a candidate reference pattern selected from the stored set of reference patterns, is either a separate intaglio module corresponding to a first element of a symbol of the candidate reference pattern and its location in the candidate reference pattern; or represents a portion of an intaglio line corresponding to a line connecting two first elements having a same parameter value p, respectively belonging to two distinct adjacent symbols of the candidate reference pattern, and a location of the line in the candidate reference pattern; and b2) in case the detected intaglio modules correspond to respective elements of the symbols of the candidate reference pattern, decoding the candidate reference pattern to obtain its candidate reference pattern identification number, thereby decoding the associated base intaglio pattern, validating the decoded candidate reference pattern and the decoded associated base intaglio pattern to obtain corresponding associated validated reference pattern and validated base intaglio pattern, and storing in the memory corresponding location data indicating a location on the digital image of the validated base intaglio pattern; and b3) in case the detected intaglio modules do not correspond to respective elements of the symbols of the candidate reference pattern, selecting a new candidate reference pattern from the stored set of reference patterns, and performing steps b1) to b2) with said new candidate reference pattern; and b4) in case the detected intaglio modules do not correspond to respective elements of the symbols of any one of the candidate reference patterns, moving the window with respect to the digital image to scan another area of the digital image and detect intaglio modules through the moved window, and performing step b1) to b3) until all the digital image is scanned through the window;

c) in case the full digital image has been scanned through the window and the detected intaglio modules do not correspond to respective elements of the symbols of any candidate reference pattern, delivering a signal indicating that the decoding of the two-dimensional intaglio pattern failed.

According to a fifth aspect of the invention, in correspondence with the above mentioned fourth aspect, the invention further relates to a device for decoding information encoded into a two-dimensional intaglio pattern of a security marking of a security element, the two-dimensional intaglio pattern comprising at least one base intaglio pattern comprising a plurality of intaglio modules, the device comprising a camera, equipped with a processor, a memory, a light sensor adapted to detect a color of a genuine intaglio pattern and distinct tones from a tone palette of said color, the genuine two-dimensional intaglio pattern of a genuine security marking of a genuine security element being according to any one of claims 1 to 4, the processor being adapted to perform image processing of a digital image of the genuine two-dimensional intaglio pattern taken by the camera and stored in the memory and perform decoding operations on encoded information detected on the digital image, the memory storing at least one reference pattern forming a two-dimensional encoded pattern on the basis of which the genuine two-dimensional intaglio pattern was produced, the device being adapted to perform the operations of:

imaging the two-dimensional intaglio pattern;

detecting, from the imaged intaglio modules of the imaged two-dimensional intaglio pattern, any reference pattern of the at least one reference pattern of the two-dimensional encoded pattern on the basis of which the associated genuine two-dimensional intaglio pattern was produced;

decoding each detected reference pattern and retrieving corresponding decoded information of the two-dimensional encoded pattern; and validating each decoded reference pattern and corresponding base intaglio pattern.

In a preferred mode of the above device for decoding information, wherein each stored reference pattern includes a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2;

each pair of allowed tones of intaglio modules of each base intaglio pattern being associated with the base intaglio pattern and stored in the memory in association with the reference pattern identification number of the reference pattern associated with said base intaglio pattern;

each stored reference pattern only comprises dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones;

the device being adapted to perform the operations of:

a) imaging the two-dimensional intaglio pattern of the security marking with the camera to obtain a digital image of the two-dimensional intaglio pattern and store the obtained digital image in the memory;

b) detecting in the stored digital image intaglio modules within a movable window of a size of an allowed reference pattern, via image processing of the pixels of the digital image scanned with the processor through the window; and b1) checking whether each of said detected intaglio modules, for a candidate reference pattern selected from the set of reference patterns, either is a separate intaglio module corresponding to a first element of a symbol of the candidate reference pattern and its location in the candidate reference pattern; or represents a portion of an intaglio line corresponding to a line connecting two first elements having a same parameter value p, respectively belonging to two distinct adjacent symbols of the candidate reference pattern, and a location of the line in the candidate reference pattern; and b2) in case the detected intaglio modules correspond to respective elements of the symbols of the candidate reference pattern, decoding the candidate reference pattern to obtain its candidate reference pattern identification number, thereby decoding the associated base intaglio pattern, validating the decoded candidate reference pattern and the decoded associated base intaglio pattern to obtain corresponding associated validated reference pattern and validated base intaglio pattern, and storing in the memory corresponding location data indicating a location on the digital image of the validated base intaglio pattern; and b3) in case the detected intaglio modules do not correspond to respective elements of the symbols of the candidate reference pattern, selecting a new candidate reference pattern from the stored set of reference patterns, and performing steps b1) to b2) with said new candidate reference pattern; and b4) in case the detected intaglio modules do not correspond to respective elements of the symbols of any one of the candidate reference patterns, moving the window with respect to the digital image to scan another area of the digital image and detect intaglio modules through the moved window, and performing step b1) to b3) until all the digital image is scanned through the window;

c) in case the full digital image has been scanned through the window and the detected intaglio modules do not correspond to respective elements of the symbols of any candidate reference pattern, delivering a signal indicating that the decoding of the two-dimensional intaglio pattern failed.

Said device for decoding information may be a smartphone equipped with a camera, a processor programmed to decode data and perform digital image processing operations on an digital image taken by the camera according to the steps of the above mentioned method of decoding information, the camera having and a mere RGB (i.e. "Red Green Blue") light sensor adapted to detect intaglio modules of a two-dimensional intaglio pattern and their tones according to the invention.

According to a sixth aspect, the invention also relates to a method of authenticating a two-dimensional intaglio pattern of a security marking of a security element, comprising the steps of:

performing the operations of decoding information encoded into the two-dimensional intaglio pattern according to the above method of decoding information, to obtain, from the imaged two-dimensional intaglio pattern, each base intaglio pattern of the two-dimensional intaglio pattern and corresponding validated reference pattern;

shifting along a plurality of distinct directions, with respect to initial positions corresponding to respective positions of the detected intaglio modules of each validated base intaglio pattern on the taken image of the two-dimensional intaglio pattern at decoding, for each validated base intaglio pattern, intaglio modules respectively corresponding to a tone of an allowed pair of tones from the tone palette of the color of the genuine two-dimensional intaglio pattern, to obtain corresponding shifted images of said intaglio modules; determining for each validated base intaglio pattern, from differences between measured tone values at initial positions of the shifted intaglio modules on the respective shifted images and measured tone values at same initial positions of said intaglio modules on the image of the two-dimensional intaglio pattern at decoding, with respect to each corresponding symbol of the associated reference pattern, a pair of shift values, respectively for intaglio modules corresponding to each tone of said pair of allowed tones, providing a maximal tone value for all the intaglio modules, respectively corresponding to each tone of said pair of allowed tones, of the validated base intaglio pattern; and determining that, for that allowed pair of tones, the respective intaglio modules of the two-dimensional intaglio pattern are in register only if a norm value of an average of the determined pairs of shift values, over all the validated base intaglio patterns of the two-dimensional intaglio pattern, is less than or equal to 10 μm, and preferably less than or equal to 5 μm.

Preferably, the above method of authenticating a two-dimensional intaglio pattern according to the invention, may comprise the steps of:

A) performing the operations a), b), b1), b2) b3), b4) and -c) of the method of decoding information encoded in a two-dimensional intaglio pattern according to the above, on the two-dimensional intaglio pattern to be authenticated;

B) in case in step A) the decoding of the two-dimensional intaglio pattern fails, delivering an information indicating that the decoding of the two-dimensional intaglio pattern failed;

C) in case the step A) provides the information encoded in the two-dimensional intaglio pattern indicating, for each stored location on the digital image of a validated base intaglio pattern, the reference pattern identification number of the associated validated reference pattern, verifying a multitone aspect of the validated base intaglio patterns by determining, from their respective associated validated reference pattern identification numbers, their allowed pair of distinct tones Ta, Tb;

measuring on the digital image a printed tone value of each intaglio module of the validated base intaglio patterns, determining a dynamic range of the digital image from the measured tone values;

calculating an average printed tone value Ta of the intaglio modules of the validated base intaglio patterns corresponding to the allowed tone Ta as an average of the measured printed tone values of the intaglio modules corresponding to the allowed tone Ta, and an average printed tone value Tb of the intaglio modules of the validated base intaglio patterns corresponding to the allowed tone Tb as an average of the measured printed tone values of the intaglio modules corresponding to the allowed tone Tb;

checking, for each allowed pair of tones Ta, Tb, whether a multitone criterion that a difference between the calculated average printed tone values Ta and Tb is greater than 1% of the dynamic range is met; and in case the multitone criterion is met for each allowed pair of tones, deciding that the two-dimensional intaglio pattern has said multitone aspect, or in case the multitone criterion is not satisfied for an allowed pair of tones Ta, Tb, deciding that the two-dimensional intaglio pattern does not have said multitone aspect and is not genuine;

D) in case the two-dimensional intaglio pattern has the multitone aspect, for each validated base intaglio pattern having a corresponding pair of allowed tones Ta, Tb, of which location in the digital image is stored in the memory, performing with the processor the operations of:

D1) measuring within the window disposed at said location on the digital image, through a sampling grid having an arrangement of symbols with respective sites of their two-dimensional elements E1 and E2 corresponding to the symbols of the validated reference pattern associated with said validated base intaglio pattern, printed tone values of the intaglio modules of the validated base intaglio pattern from pixels of the digital image located within the respective sites of elements E1 and E2 of each symbol of the sampling grid to obtain corresponding initial tone values attributed to the respective elements E1 and E2 of the symbols of the validated reference pattern associated with the validated base intaglio pattern, calculating for each symbol of the sampling grid a difference between the initial tone value attributed to the element E1 and the initial tone value attributed to the element E2 to obtain an initial differential symbol tone value and storing in the memory the obtained initial differential symbol tone values attributed to the elements of the symbols of the validated reference pattern, and, for each one of the two allowed tones Ta, Tb of the validated reference pattern, a corresponding zero-shift sum is obtained by summing the initial differential symbol tone values for the all the symbols of the validated reference pattern corresponding, respectively, to the tone Ta and the tone Tb, and the obtained zero-shift sum for the allowed tone Ta and zero-shift sum for the allowed tone Tb are stored in the memory;

D2) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Ta to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Ta, from shifted pixels of the digital image located within the respective sites of elements E1 and E2 of each symbol of the sampling grid of which first element corresponds to the allowed tone Ta, and storing in the memory the obtained shifted tone values;

calculating, for each shift, for each symbol of the sampling grid of which first element corresponds to the allowed tone Ta, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Ta;

for each shift, summing the calculated shifted differential symbol tone values of all the symbols of the sampling grid corresponding to the allowed tone Ta, to obtain corresponding validated reference pattern shift sum for the allowed tone Ta; and selecting a best shift, for the allowed tone Ta, corresponding to the greatest calculated shift sum among the calculated shift sums and the zero-shift sum, for the validated reference pattern;

calculating a global shift $\Delta_a$ for the two-dimensional intaglio pattern by determining an average of all the selected best shifts, for the allowed tone Ta, over the validated reference patterns associated with the respective validated base intaglio patterns of the two-dimensional intaglio pattern having the corresponding pair of allowed tones Ta, Tb;

D3) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Tb to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Tb, from shifted pixels of the digital image located within the respective sites of elements E1 and E2 of each symbol of the sampling grid of which first element corresponds to the allowed tone Tb, and storing in the memory the obtained shifted tone values;

calculating, for each shift, for each symbol of the sampling grid of which first element corresponds to the allowed tone Tb, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Tb;

for each shift, summing the calculated shifted differential symbol tone values of all the symbols of the sampling grid corresponding to the allowed tone Tb, to obtain corresponding validated reference pattern shift sum for the allowed tone Tb; and selecting a best shift, for the allowed tone Tb, corresponding to the greatest calculated shift sum among the calculated shift sums and the zero-shift sum, for the validated reference pattern;

calculating a global shift $\Delta_b$ for the two-dimensional intaglio pattern by determining an average of all the selected best shifts, for the allowed tone Tb, over the validated reference patterns associated with the respective validated base intaglio patterns of the two-dimensional intaglio pattern having the corresponding pair of allowed tones Ta, Tb;

D4) performing the above operations D) for each remaining pair of allowed tones Ta', Tb' from the pairs of allowed tones of the stored validated base intaglio patterns of the two-dimensional intaglio pattern, to obtain corresponding pairs of global shifts $(\Delta_{a'}, \Delta_{b'})$, and storing in the memory said pairs of global shifts;

(E) estimating a register error value r(a, b) for the intaglio modules corresponding to any allowed pair of tones Ta, Tb of all the validated base intaglio patterns of the two-dimensional intaglio pattern as r(a, b)=$\lambda$/f $(\Delta_a^2 + \Delta_b^2)^{1/2}$, wherein $\lambda$ is a size in $\mu$m (i.e. $10^{-6}$ m) of a pixel of the digital image and f is a scale factor of the digital image, and deciding that the two-dimensional intaglio pattern is genuine if each register error value r(a, b) for each allowed pair of tones Ta, Tb of the respective validated base intaglio patterns of the two-dimensional intaglio pattern is less than or equal to 10 $\mu$m, and preferably less than or equal to 5 $\mu$m.

According to a seventh aspect, in correspondence with the above authentication method, the invention further relates to a device for authenticating a two-dimensional intaglio pattern of a security marking of a security element, a genuine two-dimensional intaglio pattern of a genuine security marking of a genuine security element being according to any one of claims 1 to 4, comprising a camera, equipped with a processor, a memory, a light sensor adapted to detect a color of a genuine intaglio pattern and distinct tones of a tone palette of said color, the processor being adapted to perform image processing of a digital image of the genuine two-dimensional intaglio pattern taken by the camera and stored in the memory and perform decoding operations on encoded information detected on the digital image, the memory storing at least one reference pattern forming a two-dimensional encoded pattern based on which the genuine two-dimensional intaglio pattern was produced, the device being adapted to perform the operations of:

decoding information encoded into the two-dimensional intaglio pattern according to the above decoding method, to obtain, from the image taken by the camera of the two-dimensional intaglio pattern, each validated base intaglio pattern of the two-dimensional intaglio pattern and corresponding validated reference pattern;

shifting along a plurality of distinct directions, with respect to initial positions corresponding to respective positions of the detected intaglio modules of each validated base intaglio pattern on the taken image of the two-dimensional intaglio pattern, for each validated base intaglio pattern, intaglio modules respectively corresponding to a tone of an allowed pair of tones from the tone palette of the color of the genuine two-dimensional intaglio pattern, to obtain corresponding shifted images of said intaglio modules;

determining for each validated base intaglio pattern, from differences between measured tone values at initial positions of the shifted intaglio modules on the respective shifted images and measured tone values at same initial positions of said intaglio modules on the image of the two-dimensional intaglio pattern at decoding, with respect to each corresponding symbol of the associated reference pattern, a pair of shift values, respectively for intaglio modules corresponding to each tone of said pair of allowed tones, providing a maximal tone value for all the intaglio modules, respectively corresponding to each tone of said pair of allowed tones, of the validated base intaglio pattern; and determining that, for that allowed pair of tones, the respective intaglio modules of the two-dimensional intaglio pattern are in register only if a norm value of an average of the determined pairs of shift values, over all the validated base intaglio patterns of the two-dimensional intaglio pattern, is less than or equal to 10 $\mu$m, and preferably less than or equal to 5 $\mu$m.

Preferably, the above device, may be adapted to:

A) perform the operations a), b), b1), b2) b3), b4) and -c) of the method of decoding with the processor information encoded in a two-dimensional intaglio pattern according to the above, on the two-dimensional intaglio pattern to be authenticated, the memory further storing the allowed pairs of tones of a genuine two-dimensional intaglio pattern;

B) in case in step A) the decoding of the two-dimensional intaglio pattern fails, delivering an information indicating that the decoding of the two-dimensional intaglio pattern failed;

C) in case the step A) provides the information encoded in the two-dimensional intaglio pattern indicating, for each stored location on the digital image of a validated base intaglio pattern, the reference pattern identification number of the associated validated reference pattern, verifying a multitone aspect of the validated base intaglio patterns by determining, from their respective associated validated reference pattern identification numbers, their allowed pair of distinct tones Ta, Tb;

measuring on the digital image a printed tone value of each intaglio module of the validated base intaglio patterns, determining a dynamic range of the digital image from the measured tone values;

calculating an average printed tone value Ta of the intaglio modules of the validated base intaglio patterns corresponding to the allowed tone Ta as an average of the measured printed tone values of the intaglio modules corresponding to the allowed tone Ta, and an average printed tone value Tb of the intaglio modules of the validated base intaglio patterns corresponding to the allowed tone Tb as an average of the measured printed tone values of the intaglio modules corresponding to the allowed tone Tb;

checking, for each allowed pair of tones Ta, Tb, whether a multitone criterion that a difference between the calculated average printed tone values Ta and Tb is greater than 1% of the dynamic range is met; and in case the multitone criterion is met for each allowed pair of tones, deciding that the two-dimensional intaglio pattern has said multitone aspect, or in case the multitone criterion is not satisfied for an allowed pair of tones Ta, Tb, deciding that the two-dimensional intaglio pattern does not have said multitone aspect and is not genuine;

D) in case the two-dimensional intaglio pattern has the multitone aspect, for each validated base intaglio pattern having a corresponding pair of allowed tones Ta, Tb, of which location in the digital image is stored in the memory, performing with the processor the operations of:

D1) measuring within the window disposed at said location on the digital image, through a sampling grid having an arrangement of symbols with respective sites of their two-dimensional elements E1 and E2 corresponding to the symbols of the validated reference pattern associated with said validated base intaglio pattern, printed tone values of the intaglio modules of the validated base intaglio pattern from pixels of the digital image located within the respective sites of elements E1 and E2 of each symbol of the sampling grid to obtain corresponding initial tone values attributed to the respective elements E1 and E2 of the symbols of the validated reference pattern associated with the validated base intaglio pattern, calculating for each symbol of the sampling grid a difference between the initial tone value attributed to the element E1 and the initial tone value attributed to the element E2 to obtain an initial differential symbol tone value and storing in the memory the obtained initial differential symbol tone values attributed to the elements of the symbols of the validated reference pattern, and, for each one of the two allowed tones Ta, Tb of the validated reference pattern, a corresponding zero-shift sum is obtained by summing the initial differential symbol tone values for the all the symbols of the validated reference pattern corresponding, respectively, to the tone Ta and the tone Tb, and the obtained zero-shift sum for the allowed tone Ta and zero-shift sum for the allowed tone Tb are stored in the memory;

D2) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Ta to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Ta, from shifted pixels of the digital image located within the respective sites of elements E1 and E2 of each symbol of the sampling grid of which first element corresponds to the allowed tone Ta, and storing in the memory the obtained shifted tone values;

calculating, for each shift, for each symbol of the sampling grid of which first element corresponds to the allowed tone Ta, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Ta;

for each shift, summing the calculated shifted differential symbol tone values of all the symbols of the sampling grid corresponding to the allowed tone Ta, to obtain corresponding validated reference pattern shift sum for the allowed tone Ta; and selecting a best shift, for the allowed tone Ta, corresponding to the greatest calculated shift sum among the calculated shift sums and the zero-shift sum, for the validated reference pattern;

calculating a global shift $\Delta_a$ for the two-dimensional intaglio pattern by determining an average of all the selected best shifts, for the allowed tone Ta, over the validated reference patterns associated with the respective validated base intaglio patterns of the two-dimensional intaglio pattern having the corresponding pair of allowed tones Ta, Tb;

D3) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Tb to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Tb, from shifted pixels of the digital image located within the respective sites of elements E1 and E2 of each symbol of the sampling grid of which first element corresponds to the allowed tone Tb, and storing in the memory the obtained shifted tone values;

calculating, for each shift, for each symbol of the sampling grid of which first element corresponds to the allowed tone Tb, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Tb;

for each shift, summing the calculated shifted differential symbol tone values of all the symbols of the sampling grid corresponding to the allowed tone Tb, to obtain corresponding validated reference pattern shift sum for the allowed tone Tb; and selecting a best shift, for the allowed tone Tb, corresponding to the greatest calculated shift sum among the calculated shift sums and the zero-shift sum, for the validated reference pattern;

calculating a global shift $\Delta_b$ for the two-dimensional intaglio pattern by determining an average of all the selected best shifts, for the allowed tone Tb, over the validated reference patterns associated with the respective validated base intaglio patterns of the two-dimensional intaglio pattern having the corresponding pair of allowed tones Ta, Tb;

D4) performing the above operations D) for each remaining pair of allowed tones {Ta', Tb'} from the pairs of allowed tones of the stored validated base intaglio patterns of the two-dimensional intaglio pattern, to obtain corresponding pairs of global shifts $(\Delta_{a'}, \Delta_{b'})$, and storing in the memory said pairs of global shifts;

E) estimating a register error value r(a, b) for the intaglio modules corresponding to any allowed pair of tones Ta, Tb of all the validated base intaglio patterns of the two-dimensional intaglio pattern as $r(a, b)=\lambda/f \, (\Delta_a^2 + \Delta_b^2)^{1/2}$, wherein $\lambda$ is a size in $\mu m$ of a pixel of the digital image and f is a scale factor of the digital image, and deciding that the two-dimensional intaglio pattern is genuine if each register error value r(a, b) for each allowed pair of tones Ta, Tb of the respective validated base intaglio patterns of the two-dimensional intaglio pattern is less than or equal to 10 $\mu m$, and preferably less than or equal to 5 $\mu m$.

More preferably, the above device for authenticating, is a smartphone wherein the light sensor is a RGB light sensor, the camera has a resolving power of at least 20 $\mu m$, and wherein measuring a tone of an intaglio module of the two-dimensional intaglio pattern illuminated with an illumination light is performed by summing the respective Red, Green and Blue light intensity components detected with the RBG light sensor from received light reflected by said intaglio module.

The illumination may be provided by a flash of the smartphone, or may be mere daylight (if of sufficient light intensity).

The present invention will be described more fully hereinafter with reference to the accompanying drawings, in which prominent aspects and features of the invention are illustrated.

BRIEF DESCRIPTION OF THE DRAWINGS

FIGS. 2A, 2B-1, 2B-2, 2C and 2D show pictures of enlarged reproductions of details of two-dimensional intaglio patterns of security markings, according to the present invention, printed with a laser printer on a A4 standard printing paper.

DETAILED DESCRIPTION

Examples

The present invention is now described in more details with reference to non-limiting examples.

Example E1 Banknote Specimen

Figure 1:
FIG. 1 show a picture of a part of a specimen banknote comprising a security marking according to the present invention comprising a plurality of two-dimensional intaglio patterns, printed on an industrial intaglio press.

FIG. 1 shows a picture of a part of a specimen banknote comprising a security marking (100) according to an embodiment of the present invention. The specimen banknote was printed on an industrial intaglio press under industrial conditions using a cyan intaglio printing ink. The two-dimensional intaglio pattern of the security marking (100) is embedded in the intaglio design, in particular in the right-hand-side jacket lapel. As illustrated on FIG. 1, the two-dimensional intaglio pattern cannot be detected with naked eye and is fully integrated in the intaglio design. The first example Ex1 of two-dimensional intaglio pattern of the security marking shown in FIG. 1 was printed on an intaglio printing press (Super Orloff SOI II) under banknote industrial printing conditions, on a banknote paper substrate (fiduciary paper from Louisenthal) using an oxidative drying intaglio ink comprising alkyd-based oxidative varnishes, mineral fillers, mineral oils, waxes, oxidative driers, and 4.3 wt % of a blue pigment (Copper Phthalocyanine blue (6CI) (CAS Nr 147-14-8) from Synthesia). The security marking was printed using an intaglio plate comprising engravings having a depth of 8 µm (L area), 16 µm (M area), and 22 µm (D area) to produce the full two-dimensional intaglio pattern (201) on the jacket lapel as illustrated on FIG. 2A.

Figures 1, 2A, 2B:
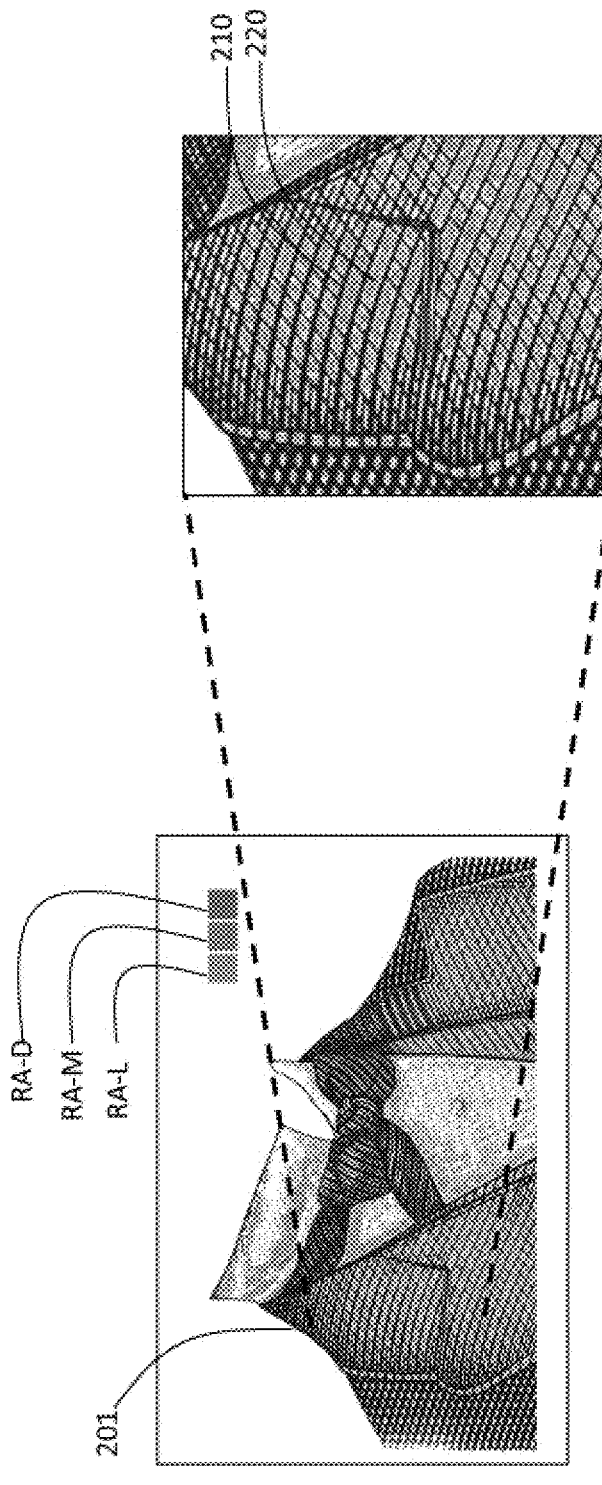

The security marking (100) of FIG. 1 corresponds to the man's portrait and his cloths. The full two-dimensional intaglio pattern (201) of FIG. 2A is located in the man's jacket lapel shown on FIG. 1 and comprises a plurality of cells, each cell including its own (small) two-dimensional intaglio pattern (220). The two-dimensional intaglio pattern (201) was authenticated, according to the invention, as genuine using a Samsung Galaxy S10 or S21 smartphone (with camera sensor of 12 mega pixels) being at a distance of about 10 cm from the banknote specimen surface.

Examples Ex2-Ex4 and Comparative Examples CEx1-CEx2

FIGS. 2A-D show pictures of enlarged reproductions of details of two-dimensional intaglio patterns of security markings, with two-dimensional intaglio patterns respectively corresponding to Examples 2-4 (Ex2-Ex4), according to the present invention, printed with a laser printer on a A4 standard printing paper. The two-dimensional intaglio patterns of the security markings of examples Ex2-Ex4 and the comparative examples CEx1-CEx2 (see FIG. 2B-D) were printed on a conventional white printer paper substrate (A4 format). The printed two-dimensional intaglio patterns of the security markings have a length of about 26.5 cm and a width of about 14.5 cm, corresponding to an about 3.5 times enlargement as compared to the security marking printed on the banknote specimen of example Ex1 of FIG. 1 (the rectangular frame in FIG. 2A corresponds to the A4 paper substrate edges) using the design vectorial file that was used to prepare the intaglio plate used for the example Ex1. Portions of a same tone of the multitone intaglio lines forming the two-dimensional intaglio pattern (201) correspond to the different intaglio modules (205) (shown on FIG. 2D) of the two-dimensional intaglio pattern.

FIG. 2A shows the two-dimensional intaglio pattern (201) disclosed herein and the multitone intaglio printed reference areas ("RA"): L (light tone area), M (middle tone area), D (dark tone area). The multitone reference areas were printed with the three tones of the (small) multitone two-dimensional intaglio pattern (220, of FIG. 2C) comprised in the security marking. The multitone reference areas (RA-L, RA-M and RA-D) were used to determine with a spectrometer the ΔE* of the three tones of the multitone security pattern. The intaglio modules (205L, 205M, 205D) respectively correspond to the portions of a same tone L, M and D of the multitone intaglio lines forming the two-dimensional intaglio pattern (220).

Figure 2C:
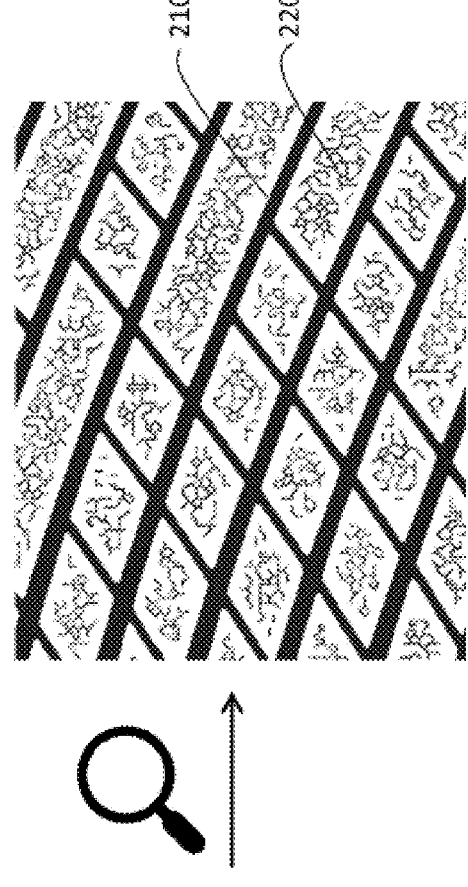
Figures 2, 2B:
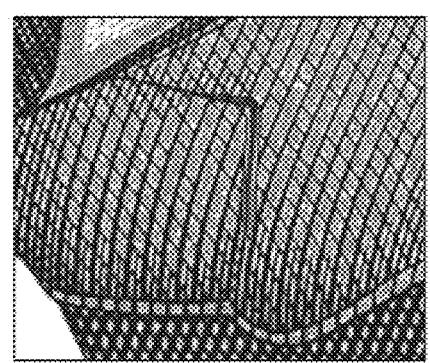
Figure 2D:
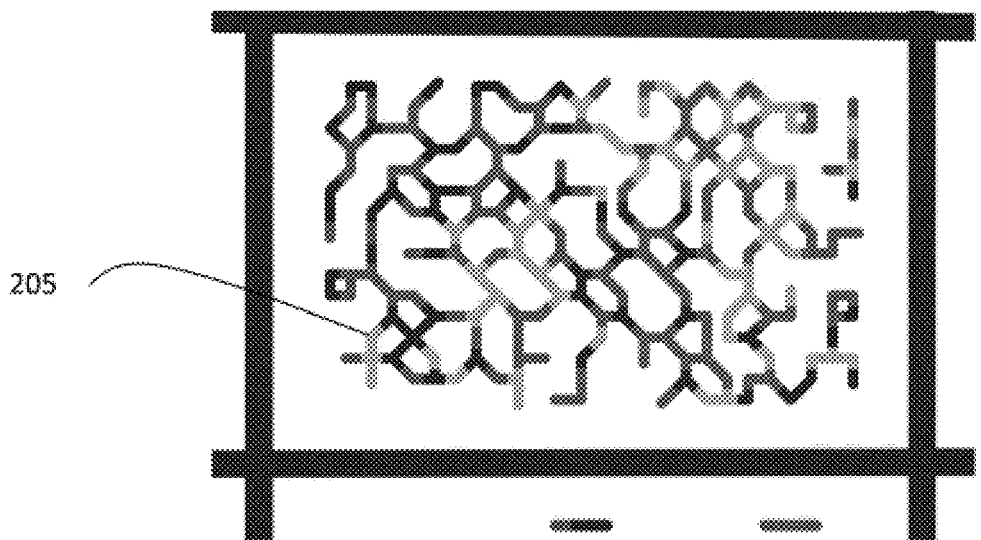

FIGS. 2B-1 and 2B-2 show an enlarged picture of a part of the intaglio pattern reproduction of FIG. 2A. As illustrated in FIGS. 2B-1 and 2B-2, intaglio lines (210), surrounding the (small) two-dimensional intaglio pattern (220), and forming the boundaries of a cell containing said two-dimensional intaglio pattern (220) (se FIG. 2C-D), are clearly visible in this enlarged representation. As illustrated in FIGS. 2B-1 and 2B-2, in this example, the intaglio lines (210) were printed in thick intaglio layer (dark tone) and were surrounding the two-dimensional intaglio pattern (220) like walls of an height greater than any height of the intaglio modules of the two-dimensional intaglio pattern, thus providing protection to the (small) two-dimensional intaglio pattern (220), and the full two-dimensional intaglio pattern (201), against mechanical abrasion.

FIG. 2C shows a picture of the FIGS. 2B-1 and 2B-2 as seen under a magnifying glass with the magnified two-dimensional intaglio pattern (220) disclosed herein. Even under the magnifying glass, the multitone characteristics of the two-dimensional intaglio pattern are hardly discernable with naked eyes, while the reading and authentication device according to the invention, in particular the smartphone, is able to distinguish the different tones and to decode and authenticate the two-dimensional intaglio pattern (201).

In order to mimic multitone characteristics of intaglio printed security markings, grey levels (Ex2-Ex3 and CEx1) or cyan levels (Ex4 and CEx2) were assigned to the file layer corresponding to the three file layers corresponding to the light/middle/dark tones (i.e. L/M/D tones) of the two-dimensional intaglio patterns and to the reference areas (RA-L, RA-M and RA-D), using Adobe Illustrator (AI). The reference areas (RA-L, RA-M and RA-D) were printed as squares with the following dimensions: 1.3 cm×1.3 cm.

The two-dimensional intaglio patterns of the security markings corresponding to Ex2-Ex4 and the comparative examples CEx1-CEx2 were printed using a laser printer (Konica Minolta bizhub C558; Quality printer parameters: Resolution: 600 dpi; Pattern: fine; Image compression: best quality; Edge enhancement: none) (FIG. 2A).

The CIE color difference ΔE* values between the three reference squares (RA-L, RA-M and RA-D), i.e. the ΔE* value L-M between the light (RA-L) and the middle (RA-M) reference squares and the ΔE* value M-D between the middle (RA-M) and the dark (RA-D) reference squares were measured using a spectrophotometer DC 45 from Datacolor (see below Table 1). The values ΔE* being calculated according to a known formula, e.g. as detailed at paragraph 102 of the cited patent EP 2 956 514 B1.

The two-dimensional intaglio patterns of examples Ex2-Ex4 and the comparative examples CEx1-CEx2 were analyzed using a Samsung Galaxy S10 or S21 smartphone disposed at a distance of about 35 cm from the prints Ex2-Ex4 or CEx1-CEx2 (i.e. at a distance about 3.5 times larger than the detection distance used for authenticating the security marking of the banknote specimen of example Ex1, see FIG. 1).

As shown in Table 1 below, the two-dimensional intaglio patterns of examples Ex2-Ex4 having ΔE*≥2.0, in particular ΔE*≥3.13, have been authenticated by the smartphone (see corresponding Y, "Yes", in the column "Authentication" of Table 1). Contrary to the two-dimensional intaglio patterns of examples Ex2-Ex4, the comparative example CEx1 having ΔE* values of 0.19 and 1.58, could not be authenticated by the smartphone, as indicated by the negative and zero Y-values (see corresponding N, "No", in the column "Authentication" of Table 1). The comparative example CEx2 having ΔE* values of 1.6 and 2.9 was just below the authentication threshold of the smartphone as indicated by the zero Y-value. The tone values (or color values) were measured as the luminance Y-values according to the well-known YUV color encoding system. The YUV color format describes a color by using the color components luminance and chrominance. The luminance component (Y) represents the brightness information of a color, the chrominance components (U and V) contain the color differences.

covert security feature. The protection of security document against counterfeit and illegal reproduction provided by covert security features relies on the concept that such features typically require specialized equipment and knowledge for their detection.

The intaglio ink described herein may comprise one or more machine readable materials selected from the group consisting of luminescent materials known in the art, magnetic materials known in the art, IR absorbing materials known in the art, forensic markers or taggants known in the art, and mixtures thereof such as to provide security markings with enhanced counterfeiting resistance, provided that said one or more machine readable do not negatively interfere with the authentication method described herein. As

TABLE 1

| | Color | Tone levels assigned in Adobe Illustrator[3] | | | Luminance difference values Y[4] (YUV model) measured with the smartphone | | | ΔE*determined with spectrophotometer DC45 | | Authentication |
|---|---|---|---|---|---|---|---|---|---|---|
| | | L[1] | M[1] | D[1] | L-D[1] | L-M[1] | M-D[1] | L-M[2] | M-D[2] | |
| Ex2 | Grey | 20 | 30 | 40 | 150 | 130 | 150 | 4.34 | 7.18 | Y |
| Ex3 | | 25 | 30 | 35 | 40 | 25 | 30 | 3.57 | 3.13 | Y |
| CEx1 | | 28 | 30 | 32 | 0 | −20 | −15 | 1.58 | 0.19 | N |
| Ex4 | Cyan | 55 | 60 | 65 | 270 | 78 | 134 | 3.8 | 7.8 | Y |
| CEx2 | | 58 | 60 | 62 | 40 | 0 | 20 | 1.6 | 2.9 | N | wherein
[1] L means light, M means middle and D means dark,
[2] L-M corresponds to ΔE* between the two consecutive tones light and middle; and M-D corresponds to ΔE* between the two consecutive tones middle and dark,
[3] values in % set in Adobe Illustrator (e.g. for the grey examples, 0% would correspond to white and 100% would correspond to black), and
[4] Luminance difference Y-values correspond to the averaged value over the entire printed pattern in arbitrary units.

The CIE tone difference (or CIE color difference) has been introduced by the International Commission on Illumination (CIE) in 1976. Given any two colors (or tones of a color) in the CIEL*a*b* color space, i.e. (L1, a1, b1) and (L2, a2, b2), the ΔE* formula is defined as:

$$\Delta E* = \sqrt{(L1 - L2)^2 + (a1 - a2)^2 + (b1 - b2)^2}$$

where:
 L1 is the CIE L* value of tone for a zone 1 of the image
 a1 is the CIE a* value of tone for a zone 1 of the image
 b1 is the CIE b* value of tone for a zone 1 of the image
 L2 is the CIE L* value of tone for a zone 2 of the image
 a2 is the CIE a* value of tone for a zone 2 of the image
 b2 is the CIE b* value of tone for a zone 2 of the image
The CIELAB space is three-dimensional and covers the entire range of human color perception: L* for perceptual lightness, and a* and b* for the four unique colors of human vision: red, green, blue, and yellow. The lightness value, L* defines black at 0 and white at 100. The a* axis is relative to the green-red opponent colors, with negative values toward green and positive values toward red. The b* axis represents the blue-yellow opponents, with negative numbers toward blue and positive toward yellow.

Intaglio inks as disclosed herein may be machine readable inks, such as for example magnetic inks, luminescent inks, IR absorbing inks and forensic inks, have been widely used in the field of security documents, in particular for banknotes printing, to confer the security document an additional used herein, the term "machine readable material" refers to a material which exhibits at least one distinctive property which is detectable by a device or a machine, such as for example a magnetic detector (when the machine readable materials have magnetic properties) or an IR-camera (when the machine readable materials have IR-absorbing properties), or a spectrophotometer (when the machine readable materials have luminescent properties) so as to confer a way to authenticate said security markings by the use of a particular equipment for its detection and/or authentication.

Should the two-dimensional intaglio pattern of the security marking described herein be made with the intaglio ink comprising the one or more machine readable materials described herein, said security marking may be further authenticated with specialized equipment, said equipment being different from the device, for example the smartphone, for authenticating described herein. Moreover, these machine readable materials may be used also for authenticating the two-dimensional intaglio pattern of the invention (as an additional security level).

Luminescent materials may also be detected with the naked eye provided that they emit in the visible range upon suitable excitation. Luminescent materials may be inorganic (inorganic host crystals or glasses doped with luminescent ions), organic or organometallic complexes of luminescent ion (s) with organic ligand(s)) substances). Luminescent materials in pigment form have been widely useed in inks (see e.g. U.S. Pat. No. 6,565,770, WO 2008/033059 A2 and WO 2008/092522 A1). Examples of luminescent materials include among others sulfides, oxysulfides, phosphates, vanadates, etc. of non-luminescent cations, doped it at least one luminescent cation chosen from the group consisting of transition-metal and the rare-earth ions; rare earth oxysulfides and rare-earth metal complexes such as those described in e.g. WO 2009/005733 A2, in EP 0 985 007 B1, U.S. Pat. Nos. 6,180,029 B1, 6,153,123 A, or in U.S. Pat. No. 7,108, 742. Examples of inorganic materials include without limitation La2O2S:Eu, ZnSi04:Mn, and YV04:Nd. Other examples include those disclosed in WO 2014/083145 A1, WO 2012/160182 A1, WO 2013/068275 A1, WO 2013/079521 A1, WO 1998/036888 A1, US 2006/0083694 A1, WO 2011/002960 A1, WO 2011/041657 A1. IR absorbing materials include organic compounds, inorganic materials, glasses comprising substantial amounts of IR-absorbing atoms or ions. Typical examples of IR absorbing compounds include among others carbon black, quinone-diimmonium or ammonium salts, polymethines (e.g. cyanines, squaraines, croconaines), phthalocyanine or naphthalocyanine type (IR-absorbing pi-system), dithiolenes, quaterrylene diimides, metal (such as for example transition metal or lanthanide) salts (such as for example fluorides, chlorides, bromides, iodides, nitrates, nitrites, sulfites, sulfates, phosphates, carbonates, borates, benzoates, acetates, chromates, hexaborides, molybdates, manganates, ferrates, organosulfates, organosulfonates, organophosphonates, organophosphates and phosphono-tungstanates), metal oxides (such as for example indium tin oxide, antimony tin oxide in nanoparticulate form, and doped tin (IV) oxide), metal nitrides. Examples may be found for example in WO 2007/060133 A2, WO 2007/132214 A1, WO 2019/219250, EP 3 068 728 B1 and WO 2018/178021. According to one embodiment, the security marking described herein comprises a first portion consisting of a machine readable security feature IR-absorbing and a second portion consisting of the security marking comprising one or more compounds absorbing in another region of the electromagnetic spectrum (UV or Vis) so as to form a combined security marking. The first and second portions of the combined security marking described herein may be adjacent, overlapping each other or spaced apart. Magnetic materials include magnetic substances such, as high- or medium-coercivity substances (such as for example iron oxides, barium ferrites, strontium ferrites or black iron oxides) and core-shell magnetic pigment particles. Examples of suitable magnetic materials include magnetic core-shell pigments particles comprising a magnetic core (preferably made of nickel, cobalt, iron and iron containing alloys and oxides) surrounded by one or more additional layers made of one or more materials selected from the group consisting of organic materials and group of inorganic materials such as those described for example in WO 2010/115986 A2 and WO 2016/005158 A1. The organic materials described herein are preferably selected from the group consisting of polyacrylates, polystyrenes, parylenes, alkoxysilanes and mixtures thereof. The inorganic materials described herein are preferably selected from the group consisting of metals (preferably selected from the group consisting of silver, aluminum and gold), metal oxides (preferably selected from the group consisting of MgO and ZnO, $Al_2O_3$, $Y_2O_3$, $Ln_2O_3$ (wherein Ln is a lanthanide), $SiO_2$, $TiO_2$, $ZrO_2$, $CeO_2$ and mixtures thereof) and metal sulfides (preferably selected from the group consisting of ZnS; CaS and mixtures thereof).

Figure 3A:
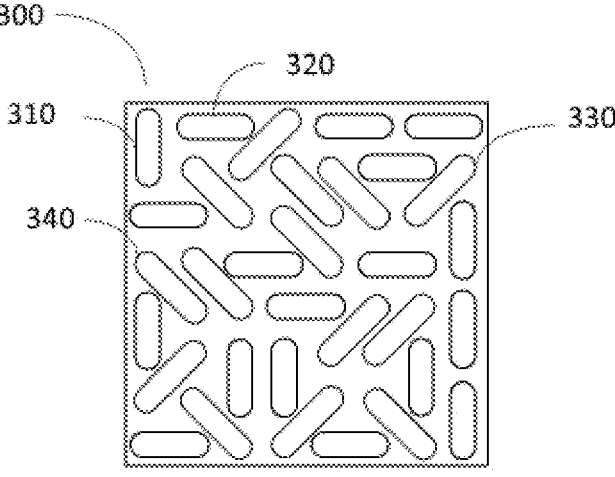
FIGS. 3A-3B illustrate an example of a reference pattern with an arrangement of symbols, and states of these symbols, according to the prior art disclosed in EP 2 619 714 B1 and EP 2 780 865 B1.
Figure 3B:
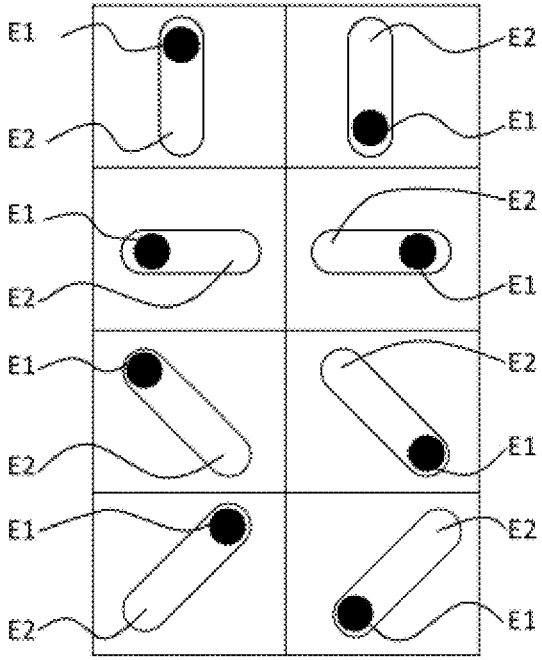

FIG. 3A shows an example of a two-dimensional reference pattern (300) according to the prior art, comprising a specific arrangement of 32 symbols (310,320,330,340), each having some oval shape. FIG. 3B shows an example of 32 two-dimensional elements E1 (black dots) and E2 (non-printed elements, or "white" dots) specifying the states of some symbols of the reference pattern (300). The reference pattern (300) with its symbols and their states can encode 32 bits of data.

Figure 4A:
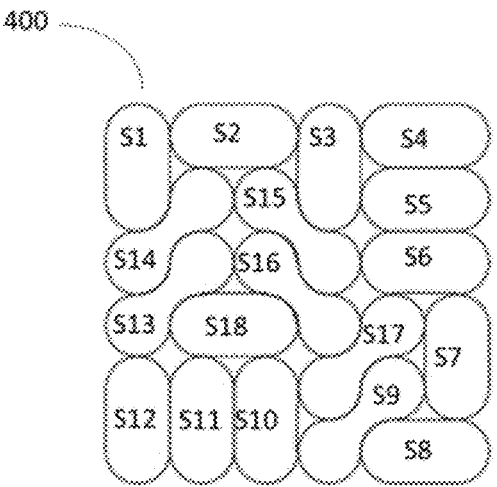
FIGS. 4A-4D illustrate an example of an encoded reference pattern as adapted to be in one-to-one correspondence with an example of a base intaglio pattern obtained by the intaglio printing process of the present invention.
Figure 4B:
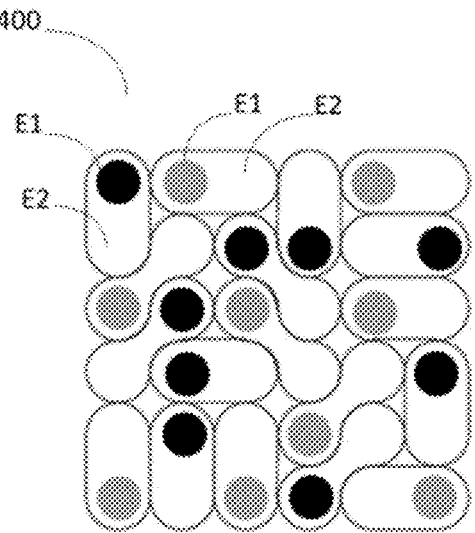

FIG. 4A is an example of an arrangement of symbols of a reference pattern (400) of a two-dimensional encoded pattern, as used in an embodiment of the invention. A two-dimensional encoded pattern may comprise only one reference pattern, but more often it comprises many reference patterns disposed according to a given arrangement, each reference pattern encoding a part of the information contained in the two-dimensional encoded pattern. According to the invention, a (two-dimensional) reference pattern encodes its corresponding (unique) identification number. In this example, the reference pattern (400) comprises 18 symbols (S1,S2, . . . , S18), that are disposed according to a specific arrangement. The symbols may have any shape, but in this example, for simplicity, only two shapes of oval type are possible. These symbols are used for encoding bits of data of the part of the information to be encoded in the reference pattern. The symbols belongs to a finite set of symbols, each symbol in the arrangement allows to encode data according to a state of said symbol. FIG. 4B shows an example of reference pattern wherein the states of the symbols are specified. In this example, a state of a symbol S consists in a specific arrangement of only two two-dimensional elements, i.e. E1 and E2, within the symbol S, each element E having a corresponding value of a parameter p(E). The parameter of the element E1 of each state of a symbol has a positive value p(E1) different from a zero value of a parameter of the other element E2 of said symbol. Elements E2 having a parameter value p(E2)=0, they are not shown on the symbols S of FIG. 4B (although they occupy a corresponding site within S), as they correspond to a non-printed or "neutral" element (or "white" element, like a white dot, when represented on a white surface). Alternatively, an element E2 could be represented, for example, with a crossed dot. A reference pattern as used in the invention may only have two types of elements having distinct positive parameter values: here the elements corresponding to black dots and those corresponding to grey dots. Of course, the allowed parameter values for the distinct elements must generally only have distinct values, but it is always possible to assign distinct positive values to the distinct elements of type E1, and a zero value to the neutral element E2 via a mere one-to-one mapping, this is just a convention (non-limitative). The (two-dimensional) elements E1 of a symbol may have any shape, but in this example, for simplicity, they all have a same dot shape of same size. For example, the element E1 of symbol S1 is shown as a black dot ("black element"), while the element E1 of the neighbor symbol S2 is shown as a grey dot ("grey element"), and their respective parameter values are distinct (and positives) so that, for example, p(black dot E1)>p(grey dot E1)>p(E2)=0. Consequently, there are only two types of symbols in the reference pattern, those with a black dot, corresponding to "black symbols" (or "dark symbols"), and those with a grey dot, corresponding to "grey symbols" (or "light symbols"). In the example shown on FIG. 4B, the reference pattern (400) has 18 symbols of two elements (E1, E2) and thus can encode 18 bits of data.

For a two-dimensional intaglio pattern of a given color, its intaglio modules can have tones from a given tone palette for that color and form a specific pattern of intaglio lines. According to the invention, a two-dimensional intaglio pattern is in one-to-one correspondence with an associated two-dimensional encoded pattern, and they both encode the same information. A two-dimensional intaglio pattern may comprise only one base intaglio pattern, but more often it comprises many base intaglio patterns, each base intaglio pattern encoding a part of the information contained in the two-dimensional encoded pattern (and thus, in the two-dimensional intaglio pattern). The plurality of base intaglio patterns are arranged within the two-dimensional intaglio pattern so as to form the specific pattern of intaglio lines corresponding to said two-dimensional intaglio pattern. According to the invention, each base intaglio pattern of the two-dimensional intaglio pattern is in one-to-one correspondence with an associated reference pattern of the two-dimensional encoded pattern, this two-dimensional encoded pattern being associated with said two-dimensional intaglio pattern, and the base intaglio pattern and its associated reference pattern both encode a same part of the information encoded in the two-dimensional intaglio pattern. This part of the information corresponds to a unique identification number attributed to this reference pattern. Also, due to the above one-to-one correspondence, each base intaglio pattern belongs to a finite set of base intaglio patterns (necessary for encoding the information). Accordingly, encoded information in each base intaglio pattern of the two-dimensional intaglio pattern specifies a reference pattern identification number of its associated reference pattern.

According to the invention, an intaglio module of the two-dimensional intaglio pattern corresponds to either:

a two-dimensional element (E1) of a symbol of the reference pattern of the two-dimensional encoded pattern having a positive parameter value (p(E1)>0); or a portion of an intaglio line corresponding to a line connecting two elements (E1) having a same positive parameter value (p(E1)), respectively belonging to two distinct adjacent symbols Si and Sj (i≠j) of a reference pattern of the two-dimensional encoded pattern associated with the two-dimensional intaglio pattern.

For example, in case the two-dimensional intaglio pattern has a blue color, and a base intaglio pattern of this two-dimensional intaglio pattern has intaglio modules of two allowed tones "dark blue" and "light blue" (from a tone palette of the blue color), the associated reference pattern of the base intaglio pattern (belonging to the two-dimensional encoded pattern associated with the two-dimensional intaglio pattern) will have symbols comprising either a black dot as element E1 (e.g. corresponding to the dark blue tone) or a grey dot as element E1 (then corresponding to the light blue tone).

Figure 4C:
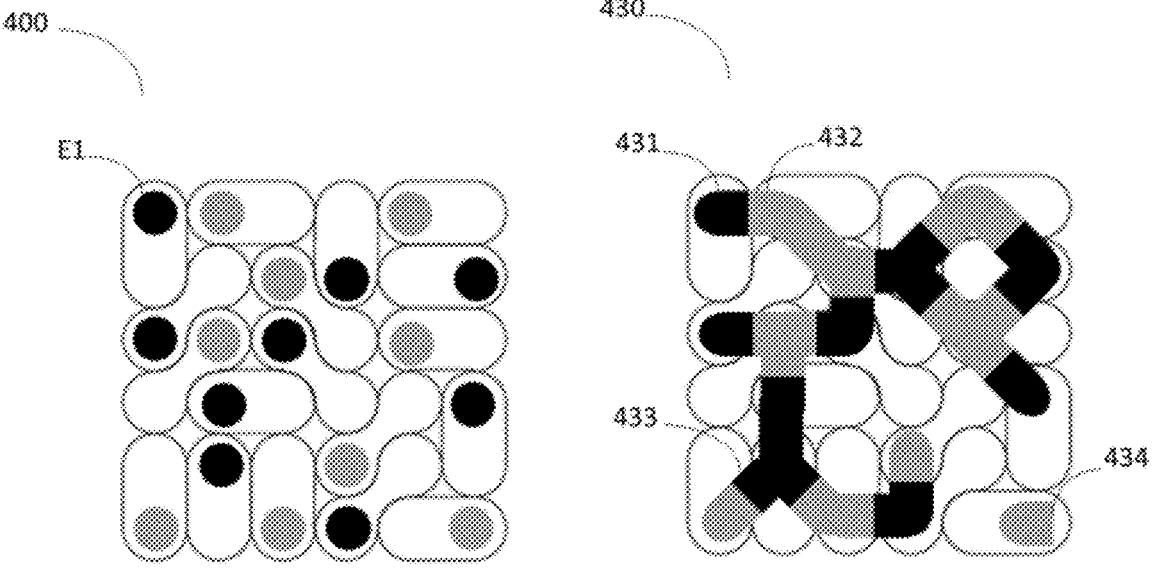

FIG. 4C shows details of an intermediate step of the construction of a base intaglio pattern (430), shown alone on right side of FIG. 4C, starting from the reference pattern (400) of FIG. 4A (shown of left side of FIG. 4C). In this example, for simplicity, the respective tones of the intaglio modules of the base intaglio pattern and of the elements E1 of its associated reference pattern are the same, i.e. black and grey. In fact, FIG. 4C shows the reference pattern (400) in superimposition with the base intaglio pattern (430) to clearly show the one-to-one correspondence between them (and with the respective symbols, and their states, of the reference pattern). For example, the intaglio module (431) of black tone corresponds to the black element E1 of symbol S1, the intaglio module (432) of grey tone corresponds to an intaglio line corresponding to a line connecting the two grey elements E1 (having a same positive parameter value) respectively belonging to the two distinct adjacent symbols S2 and S15 of the reference pattern (400), the intaglio module (433) of black tone corresponds to an intaglio line corresponding to a line connecting the two black elements E1 respectively belonging to the two distinct adjacent symbols S11 and S18 of the reference pattern (400) (this line has a shape of an inverted Y), and the intaglio module (434) of grey tone is a portion of intaglio line that corresponds to the single grey element E1 of symbol S8 of the reference pattern (400). The intaglio modules (431) and (432) form two portions of a continuous intaglio line. Thus, from the above rules for connecting the modules, for each allowed reference pattern, it is possible to build an associated base intaglio pattern, and the correspondence between their identification numbers (in practice, they have the same identification number, i.e. that of the associated reference pattern) unambiguously determines their one-to-one correspondence.

Figure 4D:
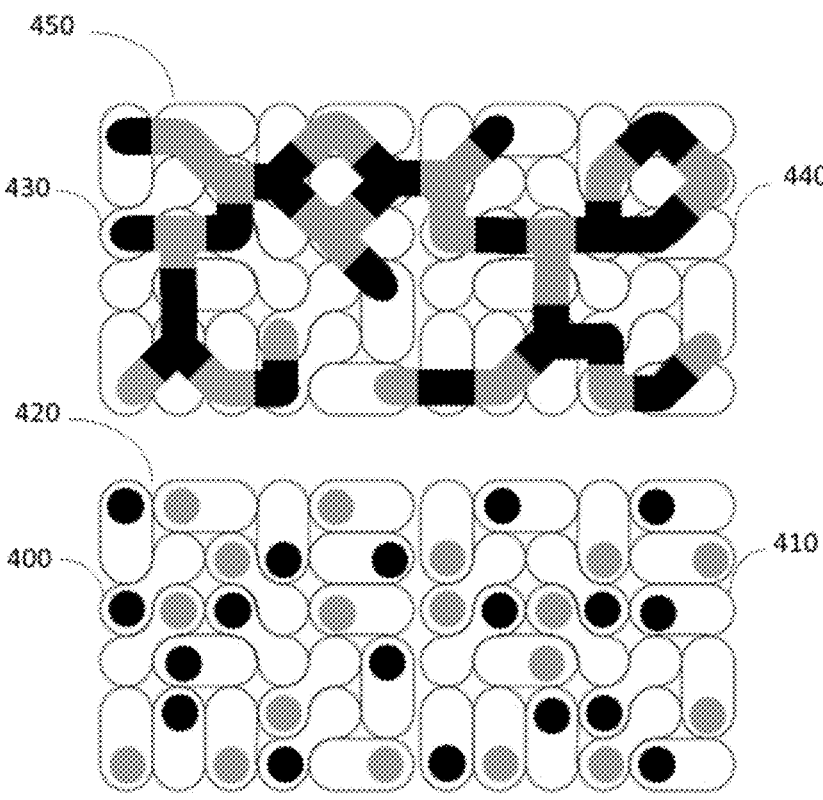

On top of FIG. 4D, a partial view of an example of two-dimensional intaglio pattern (450) is illustrated, showing only two base intaglio patterns (430) and (440), respectively corresponding (one-to-one) with two reference patterns (400) and (410) of an associated two-dimensional encoded pattern (420) shown on bottom of FIG. 4D. In the example shown on FIG. 1, the security marking (100) comprises about 1400 two-dimensional intaglio patterns in as many cells, each two-dimensional intaglio pattern comprising 16 reference patterns, each reference pattern comprising 18 symbols of two elements of two possible tones. As clearly visible on the two-dimensional intaglio pattern (450), its intaglio modules form a specific pattern of intaglio lines (like interconnected branches of a graph forming a continuous path). In a variant of the above example (not shown), a two-dimensional intaglio pattern may also contain discrete intaglio modules (i.e. not connected with other intaglio modules so as to form a continuous intaglio line).

A two-dimensional intaglio pattern e.g. like the one schematically illustrated on FIG. 4D, or the one of the security marking (100) shown on FIG. 1, is obtained by using an engraved plate for an intaglio printing machine (not shown), said engraved plate comprising grooves of variable depth adapted to receive an intaglio ink to print on a surface of a substrate said two-dimensional intaglio pattern. The variations of depth providing printed intaglio lines of corresponding variable height that provide the multitone aspect of the lines.

The variable engraving depth and the specific arrangement of engraved grooves of variable engraving depth of the engraved plate allow, once appropriately inked with the intaglio ink, to print on a surface of a substrate the two-dimensional intaglio pattern having the color of the intaglio ink and comprising a plurality of intaglio modules forming a specific pattern of intaglio lines corresponding to the inked grooves, each intaglio module having a tone of said color: this tone belongs to a tone palette of a plurality of distinct reference tones of the color (ranging from a darker tone to a lighter tone) that correspond to the distinct engraving depths of the grooves on the intaglio plate. The choice of intaglio ink and depth variations of the grooves is such that a CIE color index difference $\Delta E^*$ between any two consecutive tones of the tone palette is greater or equal than 2.0 (that can be detected with a mere smartphone), and allow to print the two-dimensional intaglio pattern on the surface in which a width C of an intaglio line is greater than 20 μm and less or equal than 50 μm.

The above engraved plate can be used in an intaglio printing machine for printing a two-dimensional intaglio printing according to the invention. Thus, an example of the production of a two-dimensional intaglio pattern of a security marking, to be marked on a surface of a substrate, involves the following operations of:

generating a two-dimensional encoded pattern (420) comprising 16 reference patterns, particularly the two reference patterns (400) and (410), by encoding a corresponding portion of received information (i.e. their respective identification numbers) into said two reference patterns (400, 410) belonging to a finite set of 16 reference patterns forming the two-dimensional encoded pattern, each reference pattern including a specific arrangement of a plurality of symbols belonging to a finite set of symbols, each symbol in the arrangement allowing to encode data according to a state of said symbol;

a state of a symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2;

each reference pattern only comprises dark symbols (e.g. reference pattern (400) has the dark symbols S1, S3, S5, S7, S9, S11, S13, S15 and S18) and light symbols (S2, S4, S6, S8, S10, S12, S14, S16 and S17), the parameter value of the first element of a dark symbol corresponding to a darker tone of an associated pair of allowed tones (e.g. this parameter value designates a first element E1 being a black dot), selected from a tone palette of a plurality of distinct reference tones of a color associated with the two-dimensional encoded pattern (i.e. the color of the two-dimensional intaglio pattern to be printed), and the parameter value of the first element of a light symbol corresponding to the lighter tone of said associated pair of allowed tones (e.g. this parameter value designates a first element E1 being a grey dot);

the two-dimensional intaglio pattern (450) to be produced being in one-to-one correspondence with the generated two-dimensional encoded pattern (420) and encoding the same information, and comprising a plurality of intaglio modules, each intaglio module having a tone of said associated color, a tone of an intaglio module being selected from the tone palette;

the two-dimensional intaglio pattern comprising two base intaglio patterns (430) and (440), each base intaglio pattern encoding a portion of said information and being in one-to-one correspondence with an associated reference pattern (respectively, 400 and 410) of the two-dimensional encoded pattern (420);

each base intaglio pattern only comprising intaglio modules of which tones belong to the pair of allowed tones of the associated reference pattern (in this example of FIG. 4, the two allowed tones are the black and the grey, i.e. the same tones as for the reference pattern);

an intaglio module of the two-dimensional intaglio pattern (450) associated with the generated two-dimensional encoded pattern (420) corresponding to either a first element of a symbol of a reference pattern of the two-dimensional encoded pattern (e.g. the dark element E1 of symbol S1 of the reference pattern 400); or a portion of an intaglio line corresponding to a line connecting two elements having a same positive parameter value p, respectively belonging to two distinct adjacent symbols of a reference pattern of the two-dimensional encoded pattern (e.g. portion (432) of intaglio line of base intaglio pattern (430), linking grey elements E1 of adjacent symbols S2 and S15 of the reference pattern (400));

(ii) engraving a plate of an intaglio printing machine with variable engraving depth adapted to receive an intaglio ink of the color of the two-dimensional intaglio pattern (450) and to reproduce the intaglio modules according to the generated two-dimensional encoded pattern (420)); and (iii) inking the plate with the intaglio ink and using the inked plate with the intaglio printing machine to print on a surface of a substrate the corresponding two-dimensional intaglio pattern (450).

Figure 5:
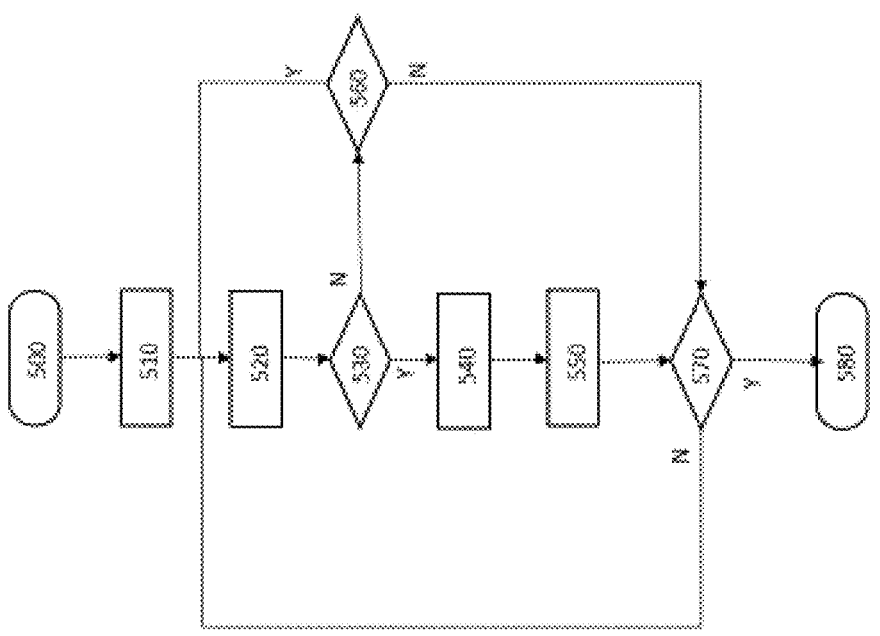
FIG. 5 is a flowchart illustrating an example of decoding of a two-dimensional intaglio pattern with a smartphone.

FIG. 5 is a flowchart illustrating an example of a method of decoding a two-dimensional intaglio pattern of the invention with a smartphone equipped with a camera, a processor, a memory and a RGB ("Red Green Blue") light sensor. The processor is adapted (i.e. specifically programmed) to carry out image processing operations and decoding operations on a digital image of a genuine two-dimensional intaglio pattern to extract information encoded in the two-dimensional intaglio pattern. The genuine two-dimensional intaglio pattern considered for illustrating the decoding operations is that of FIG. 4D. This genuine two-dimensional intaglio pattern (450) merely comprises two base intaglio patterns (430, 440), each base intaglio pattern (430, 440) including a plurality of intaglio modules forming a (known) pattern of intaglio lines specific to the two-dimensional intaglio pattern (450). Each base intaglio pattern (430, 440) only comprises intaglio modules of two allowed distinct tones (dark and grey), corresponding to the allowed pair of tones {dark, grey}, i.e. dark modules (in black) and grey modules. These dark and grey tones of the reference patterns in fact generally stand for two distinct tones of a given color, e.g. respectively dark blue and mid blue tones, of a two-dimensional intaglio pattern of which color is blue. As an example, for all the intaglio modules, the CIE color difference $\Delta E^*$ between these two tones verifies $\Delta E^* \geq 2.5$. The width $\varepsilon$ of the intaglio lines of the two-dimensional intaglio pattern are of about 30 μm (±2 μm).

The RGB light sensor of the camera is adapted to detect a color of intaglio modules forming the genuine intaglio pattern and the above mentioned two distinct tones of the tone palette, e.g. {dark blue, mid blue} of a blue color, to obtain a digital image of the two-dimensional intaglio pattern. The two-dimensional intaglio pattern (450) is in one-to-one correspondence with the associated two-dimensional encoded pattern (420), and each base intaglio pattern (430, 440) is in one-to-one correspondence, respectively, with each of the reference patterns (400, 410) forming said two-dimensional encoded pattern (420). The identification numbers of the base intaglio patterns being the same as the identification numbers of the corresponding (associated) reference patterns (respectively encoded in these reference patterns). According to the invention, in order to decode the information encoded into a two-dimensional intaglio pattern, it is necessary to first detect on a digital image of the two-dimensional intaglio pattern taken by the camera, the intaglio modules that form the two-dimensional intaglio pattern, and then verify that the detected intaglio modules are in one-to-one correspondence with the dark and grey elements of the arrangement of symbols of the associated two-dimensional encoded pattern. According to the invention, the mapping rules for establishing a one-to-one correspondence between a detected intaglio module and states of symbols of the two-dimensional encoded pattern are that an intaglio module of the genuine two-dimensional intaglio pattern may only correspond to either an element of a symbol of the reference pattern of the two-dimensional encoded pattern having a positive parameter value (here, corresponding to a dark element or a grey element); or a portion of an intaglio line corresponding to a line connecting two elements having a same positive parameter value p (here, connecting two dark elements or two grey elements), respectively belonging to two distinct adjacent symbols of a reference pattern of the two-dimensional encoded pattern.

The memory of the smartphone storing a finite set of allowed reference patterns forming a known two-dimensional encoded pattern associated with the known genuine two-dimensional intaglio pattern.

In order to detect on the digital image of the two-dimensional intaglio pattern the intaglio modules that form the two-dimensional intaglio pattern, the processor performs an image processing operation on the acquired digital image consisting in using a movable window, having a size of a base intaglio pattern, that is shifted with respect to the digital image to successively scan the full digital image (see also the "analysis window" in the cited document EP 2 780 865 B1, and e.g. its claim 12). At each position of the window on the digital image, the RGB intensities (here, the respective intensities of the Red, Green and Blue components are just summed) of the pixels within the window are analyzed to detect a presence of distinct groups of pixels of two different tones: these detected groups of pixels corresponding to the respective digital images of a set of intaglio modules of two different tones. In practice, a dynamic range of the digital image is determined from the tone values measured by the RGB sensor, and a check is performed to control that a difference of measured tone values of any two intaglio modules is indeed greater than at least 1% of the determined dynamic range. These intaglio modules (in fact, their corresponding groups of pixels) detected through the window are thus of two distinct tones, those of a darker tone and those of a lighter tone.

Each time a set of intaglio modules is detected through the window, the processor checks whether, respectively, these groups of pixels can be mapped, in a one-to-one correspondence, on one of the allowed reference patterns stored in the memory and corresponding to a base intaglio pattern of the genuine two-dimensional intaglio pattern: the groups of pixels being tentatively mapped according to the above mapping rules on the two-dimensional elements E1 of the symbols of a candidate reference pattern, selected from the stored set of reference patterns forming the two-dimensional encoded pattern. In case such a mapping is possible, the corresponding candidate reference pattern is decoded, and its identification number is extracted (also giving the identification number of the associated candidate base intaglio pattern). Then, the candidate reference pattern is validated, as well as the corresponding base intaglio pattern, and these validations are stored in the memory in relation to the decoded identification number of the candidate reference pattern. If the tentative mapping fails, then the candidate reference pattern is rejected and a new candidate reference pattern is considered for a corresponding new tentative mapping (and new further check), until all the allowed reference patterns stored in the memory have been tested. In case none of the possible candidate reference patterns can be validated, the window is moved (shifted) with respect to the digital image toward a new location, and the above operations are repeated by the processor until all the digital image is scanned through the window.

Clearly, if no candidate reference pattern can be validated after the scan of the full digital image, the imaged two-dimensional intaglio pattern either corresponds to a (strongly) damaged genuine two-dimensional intaglio pattern or to a fake two-dimensional intaglio pattern. The above operations are summarized on the flowchart of FIG. 5 relating to an example of embodiment of the decoding according to the invention, wherein:

at step 500, the decoding starts for a given two-dimensional intaglio pattern (printed on a surface of a substrate, e.g. a security document);

at step 510, the two-dimensional intaglio pattern is imaged with the camera of the smartphone and the acquired digital image is stored in the memory;

at step 520, a candidate reference pattern from the set of stored reference patterns is selected;

at step 530, the groups of pixels are respectively tentatively mapped, according to the mapping rules, on the black elements of the symbols of the candidate reference pattern and on the grey elements of the symbols of the candidate reference pattern, and if such a mapping is possible (Y) the following step 540 is performed, or if the mapping is not possible (N) the step 560 is performed;

at step 540, the corresponding candidate reference pattern is decoded, and its identification number is extracted (also giving the identification number of the corresponding candidate base intaglio pattern);

at step 550, the candidate reference pattern and the corresponding base intaglio pattern are validated, and these validations are stored in the memory in relation to the decoded identification number of the candidate reference pattern;

at step 560, the candidate reference pattern is rejected and a new candidate reference pattern is considered for a corresponding a new tentative mapping (and new further check) at step 520 if all the possible candidate reference patterns from the allowed reference patterns stored in the memory have not been tested ("Y"), and if on the contrary all the possible candidate reference patterns from the allowed reference patterns stored in the memory have been tested ("N"), the step 570 is performed;

at step 570, if all the digital image is scanned the step 580 is performed ("Y"), if not ("N") the window is moved (shifted) with respect to the digital image to a new location, and the above operations from step 520 are repeated by the processor;

at step 580, the operations stop.

There are many possibilities for checking a one-to-one correspondence between the (pixels of the) intaglio modules within the window and the two-dimensional elements of the symbols of a (candidate) reference pattern, in accordance with the mapping rules. For example, it is possible to use a sampling grid corresponding to the arrangement of symbols, including the sites occupied by their corresponding two-dimensional elements E1, of the (candidate) reference pattern and disposed within the window (via image processing with the processor). Then, it is possible to detect through the grid the pixels relating to each intaglio module that are comprised within the sites of the two-dimensional elements E1 of the respective symbols of the (candidate) reference pattern. As illustrated on FIG. 4A, the sampling grid within the window is in fact the "grid" formed by the respective boundaries of the symbols corresponding to the (candidate) reference pattern, once the reference pattern has been put to scale with the size of the window: the groups of pixels relating to an intaglio module can then be directly (tentatively) located within the symbols, and checking whether said group of pixels is fully, or only partially, located within a symbol at a location corresponding to that of an element E1 of the symbol is easy via image processing. A criterion may be used in case of a partial location of a group of pixels within a symbol: e.g., in case more than a quarter of said pixels are within the boundary of the symbol, but out of a site within the symbol corresponding to that of an element E1, this group of pixels (and thus, the corresponding detected intaglio module) is considered as not corresponding to the element E1 of the symbol.

According to the invention, a two-dimensional intaglio pattern of a security marking can be authenticated, once decoded, for example with the smartphone used for decoding (see above), by both verifying a multitone aspect of said two-dimensional intaglio pattern, and determining that a register error between its various intaglio modules that are interconnected so as to form a pattern of intaglio lines is below a given small value (e.g. 10 μm and preferably 5 μm), even if the typical width of an intaglio line of said two-dimensional intaglio pattern is greater than 20 μm (and less than or equal to 50 μm). A characteristic feature of the authentication of a two-dimensional intaglio pattern according to the invention is the synergy existing between the operations of decoding of the two-dimensional intaglio pattern, verifying its multitone aspect and determining whether a register error between the various parts of its specific pattern of intaglio lines is below a given threshold. Indeed, the decoding of the intaglio modules of a base intaglio pattern, together with tiny shifts performed around their positions at decoding stage on a digital image of said base intaglio pattern, with respect to a sampling "grid" formed by the arrangement of symbols of the associated reference pattern, in order to maximize (on average) a difference of tone values between elements E1 and E2 of the symbols of the grid, provides a robust and precise estimation of a register error between intaglio modules of distinct tones, thus allowing to easily detect any fake marking obtained in particular via multitone offset printing, even with a mere smartphone.

Figure 6A:
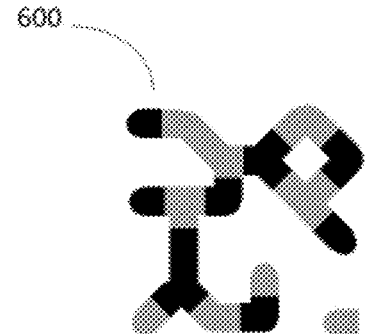
FIGS. 6A-6G schematically illustrate operations of an example of the method of authentication of a two-dimensional intaglio pattern.
Figure 6A:
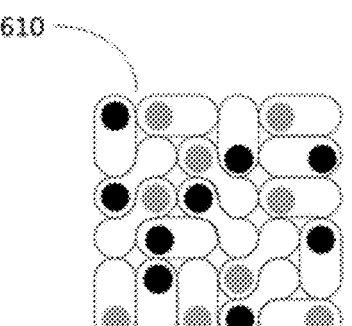
Figure 6B:
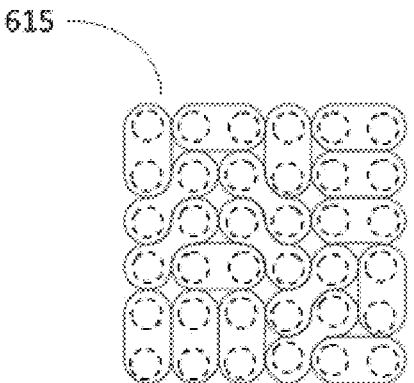
Figure 6C:
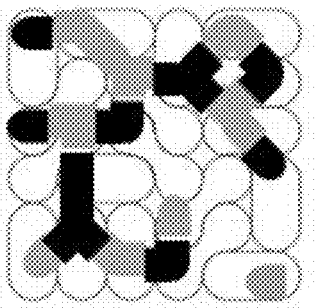

FIG. 6A illustrates an example of a base intaglio pattern (600) of a two-dimensional intaglio pattern (not shown) that comprises a plurality of base intaglio patterns, and its associate reference pattern (610) of a two-dimensional encoded pattern (not shown) associated with the two-dimensional intaglio pattern according to the invention. As seen above, at decoding stage of the base intaglio pattern (600), a mapping is (approximately) established between detected groups of pixels corresponding to intaglio modules (typically, there are at least 3 pixels per module) and states of the symbols belonging to the reference pattern. However, this mapping is not necessarily "perfect", as it is illustrated on FIG. 6C wherein the detected groups of pixels on the digital image of a base intaglio pattern, when superimposed to the arrangement of symbols (with the sites of their elements E1 and E2 shown with dotted lines) of the sampling grid (615) corresponding to the reference pattern (610) shown on FIG. 6B (corresponding to the reference pattern of FIG. 4A), once put to scale, may partly overlap the indicated boundaries of the symbols. Clearly, certain groups of pixels are not perfectly superimposed to the sites of the two-dimensional elements (dark or grey) of the reference pattern. For example, the pixels relating to the dark intaglio module corresponding to the dark element E1 of symbol S7 on FIG. 6C are partly shifted out of the symbol S7 (nevertheless, the right state of symbol S7 can be retrieved from the pixels located within the site of element E1). This means that a measured difference of tone, for a symbol (e.g. S7) of the sampling grid, between pixels of the digital image in the window corresponding to the element E1 of the symbol and the neutral element E2, i.e. between the pixels respectively located within the sites corresponding to the elements E1 and E2 of the symbol, will not reach its standard value (some light intensity being lost due to the pixels shifted out of the symbol). The standard value being reached when the group of pixels corresponding to E1 is well ("perfectly") positioned within the symbol. Nevertheless, a mapping can still be obtained as there are still some pixels at the site of element E1 in the symbol (and thus a difference of parameter values between E1 and E2 of the symbol still exists), and the base intaglio pattern can be decoded.

FIG. 6C illustrates the case of a base intaglio pattern that has been decoded although its detected intaglio modules are not perfectly superimposed to the symbols of the associated reference pattern. The corresponding positions of the intaglio modules are in fact the positions of the groups of pixels detected via image processing on the digital image, corresponding to the intaglio modules. They are located within the symbols. As explained above, it is indeed possible that a base intaglio pattern can be decoded while its intaglio modules are not in register: for example, some pixels may be beyond a border of a site of an element of a symbol, although a majority of pixels of each group of pixels corresponding to the respective intaglio modules are correctly located within the sites of the elements of corresponding symbols of the associated reference pattern (the states are correctly identified), and thus decoding of the base intaglio pattern is still possible. Below, these decoding positions are considered as constituting initial positions of the groups of pixels on the digital image, or initial positions of the detected intaglio modules in short.

In order to verify a multitone aspect of a decoded base intaglio pattern, i.e. of a validated base intaglio pattern as explained above, the following operations are performed with the smartphone, wherein locations on the digital image of the validated base intaglio patterns and their corresponding associated validated reference pattern identification numbers are stored in the memory of the smartphone:

determining, from the associated validated reference pattern identification number (obtained at decoding), its allowed pair of distinct tones {Ta, Tb}(stored in the memory);

measuring on the digital image a printed tone value of each intaglio module of the validated base intaglio pattern; e.g. by measuring with the RGB light sensor of the smartphone the RGB components of the corresponding pixels, detected through the above mentioned sampling grid corresponding to the associated validated reference pattern, at the sites of the elements E1 of the symbols;

determining a dynamic range of the digital image of the validated base intaglio pattern, for the allowed pair of tones, from the measured tone values (here, the dynamic range is the difference between the highest measured tone value and lowest measured tone value);

checking whether a difference of measured mean tone values of the intaglio modules verifies the condition that it is greater than at least 1% of the dynamic range and, in case the condition is satisfied, deciding that the validated base intaglio pattern has said multitone aspect, in case the condition is not satisfied, deciding that the validated base intaglio pattern has not said multitone aspect and is not genuine.

More precisely, the above difference is calculated as follows:

first, an average printed tone value <Ta> of the intaglio modules of the validated base intaglio patterns corresponding to the allowed tone Ta is calculated as an average of the measured printed tone values of the intaglio modules corresponding to the allowed tone Ta. Also, an average printed tone value <Tb> of the intaglio modules of the validated base intaglio patterns corresponding to the allowed tone Tb is calculated as an average of the measured printed tone values of the intaglio modules corresponding to the allowed tone Tb. Then:

a difference between the calculated average printed tone values <Ta> and <Tb> is calculated, and it is checked, for each allowed pair of tones {Ta, Tb}, whether a multitone criterion that a difference between the calculated average printed tone values <Ta> and <Tb> is greater than 1% of the dynamic range is met.

Thus, the validated base intaglio patterns that have not a multitone aspect are rejected and the two-dimensional intaglio pattern is considered as being not genuine.

Once a multitone aspect of the validated base intaglio patterns has been established, the determination of a register error can start based on these validated base intaglio patterns (of which locations on the digital image are stored in the memory of the smartphone). For example, considering the (validated) base intaglio pattern as illustrated on FIG. 6C, that has been decoded and has clearly a multitone aspect, this validated base intaglio pattern having a corresponding pair of allowed tones {Ta, Tb}(here, dark and grey), is observed through the sampling grid (615) of corresponding associated validated reference pattern (see FIG. 6B) disposed within the window (and put to scale within the window) at location in the digital image of said validated base intaglio pattern (stored in the memory), and the processor of the smartphone performs the operations of:

(1) measuring within the window, through the arrangement of symbols with respective sites of their two-dimensional elements E1 and E2 corresponding to said validated reference pattern, the printed tone values of the intaglio modules of the validated base intaglio pattern from the pixels of the digital image that are located within the respective sites of the elements E1 and E2 of each symbol of the sampling grid. The measure of a tone value resulting from a sum of the respective R, G and B (Red, Green and Blue) intensity components of the detected pixels. This measuring provides initial (i.e. from positions of the pixels corresponding to the ones at the decoding stage) tone values attributed to the respective elements E1 and E2 of the symbols of the validated reference pattern associated with the validated base intaglio pattern. Then, for each symbol of the sampling grid, a difference between the initial tone value attributed to the element E1 and the initial tone value attributed to the element E2 is calculated with the processor to obtain an initial differential symbol tone value for each symbol of the sampling grid (i.e. of the corresponding reference pattern), and the obtained initial differential symbol tone values attributed to the elements of the symbols of the validated reference pattern (corresponding to the pair of tones {Ta, Tb}) are stored in the memory of the smartphone. One may consider that these stored initial differential symbol tone values in fact correspond to a zero-shift. Then, for each one of the two allowed tones {Ta, Tb} of the validated reference pattern, a corresponding zero-shift sum is obtained by summing the initial differential symbol tone values for the all the symbols of the sampling grid (i.e. of the validated reference pattern) corresponding, respectively, to the tone Ta and the tone Tb, and the obtained zero-shift sum for the allowed tone Ta and zero-shift sum for the allowed tone Tb are stored in the memory.

(2) shifting by at least one pixel size, via image processing of the digital image with the processor, backward and forward along each of a plurality of distinct directions (see FIG. 6D-E, for the vertical direction, where forward corresponds to top as on FIG. 6D, and backward corresponds to bottom as on FIG. 6E) with respect to the digital image (in this example, there are only two directions: the vertical and the horizontal ones), the pixels of the digital image located within the respective sites of elements E1 and E2 of each symbol of the sampling grid of which first element E1 corresponds to the allowed tone Ta to obtain corresponding shifted pixels having shifted positions with respect to the elements of the symbols of the sampling grid (see FIG. 6C); in fact, all the pixels within the window are shifted in block along the direction, via image processing: consequently, the pixels that were initially within a site of an element E1 or E2 are shifted in block, and the (new) shifted pixels of the digital image that are within the site of E1 or E2 (respectively) are used for measuring the new tone value at this site. As a remark, it would be equivalent to say that the window, together with the sampling grid, has been shifted in the opposite sense along the direction with respect to the digital image.

measuring through the sampling grid, respectively for the backward shift and the forward shift along each direction (i.e. there are two shifts per direction), corresponding backward shifted and forward shifted tone values attributed to the respective elements E1 and E2 of the symbols of the sampling grid of which first element E1 corresponds to the allowed tone Ta, from the shifted pixels of the digital image that are located within the respective sites of elements E1 and E2 of each symbol of the sampling grid (of which first element corresponds to the allowed tone Ta), and storing in the memory the obtained shifted tone values. For example, with said sampling grid of symbols, once the pixels of an intaglio module have been shifted from their initial positions within a symbol, only a part of said pixels possibly remains located within the site of element E1 of the symbol, these remaining pixels are used for determining the new tone value (shifted tone value) for this element of the symbol.

calculating, for each shift, and for each symbol of the sampling grid of which first element corresponds to the allowed tone Ta, a difference between the shifted tone value attributed to the element E1 and the shifted tone value attributed to the element E2 to obtain corresponding shifted differential symbol tone values (i.e. $\delta$=tone value attributed to E1—tone value attributed to E2), and storing in the memory the obtained shifted differential symbol tone values attributed to the elements of the symbols of the validated reference pattern (of which first element corresponds to the allowed tone Ta);

for each shift, summing the calculated shifted differential symbol tone values of all the symbols of the sampling grid corresponding to the allowed tone Ta, to obtain corresponding validated reference pattern shift sum for the allowed tone Ta;

selecting a best shift, for the allowed tone Ta, corresponding to the greatest calculated shift sum among the calculated shift sums (in this example, there are four shift sums) and the zero-shift sum, for the validated reference pattern. It is thus possible that the best shift, for the allowed tone Ta, in fact corresponds to the zero-shift if the zero-shift sum for the allowed tone Ta has the greatest value. This allows in fact to select the shift giving a best matching of the pixels of the intaglio modules with the elements E1 of corresponding symbols. And then, once the above operations are repeated for each one of the validated base intaglio patterns forming the two-dimensional intaglio pattern (and having the corresponding pair of allowed tones {Ta, Tb}), calculating a global shift $\Delta_a$ for the two-dimensional intaglio pattern by determining an average of all the selected best shifts, for the allowed tone Ta, over the validated reference patterns associated with the respective validated base intaglio patterns of the two-dimensional intaglio pattern having the corresponding pair of allowed tones {Ta, Tb}. Thus, only the best shifts for the validated reference patterns are added, and then divided by the number of said validated reference patterns, to obtain the global shift for the two-dimensional intaglio pattern.

(3) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Tb to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Tb, from shifted pixels of the digital image located within the respective sites of elements E1 and E2 of each symbol of the sampling grid of which first element corresponds to the allowed tone Tb, and storing in the memory the obtained shifted tone values;

calculating, for each shift, for each symbol of the sampling grid of which first element corresponds to the allowed tone Tb, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Tb;

for each shift, summing the calculated shifted differential symbol tone values of all the symbols of the sampling grid corresponding to the allowed tone Tb, to obtain corresponding validated reference pattern shift sum for the allowed tone Tb;

selecting a best shift, for the allowed tone Tb, corresponding to the greatest calculated shift sum among the calculated shift sums and the zero-shift sum, for the validated reference pattern; and then, once the above operations are repeated for each one of the validated base intaglio patterns forming the two-dimensional intaglio pattern (and having the corresponding pair of allowed tones {Ta, Tb}), calculating a global shift $\Delta_b$ for the two-dimensional intaglio pattern by determining an average of all the selected best shifts, for the allowed tone Tb, over the validated reference patterns associated with the respective validated base intaglio patterns of the two-dimensional intaglio pattern having the corresponding pair of allowed tones {Ta, Tb}. As a result of operations (1) to (3) performed on all the validated base intaglio patterns of the two-dimensional intaglio pattern (for the pair of allowed tones {Ta, Tb}), we obtain a set of points, in the space of the shifts along each said plurality of directions, of coordinates $(\Delta_a,\Delta_b)_1$, $(\Delta_a,\Delta_b)_2$, . . . .

(4) performing the above operations (1-3) for each remaining pair of allowed tones {Ta', Tb'} from the pairs of allowed tones of the stored validated base intaglio patterns of the two-dimensional intaglio pattern, to obtain corresponding pairs of global shifts $(\Delta_{a'}, \Delta_{b'})$, and storing in the memory said pairs of global shifts. As a result of operations (1) to (4) performed on all the validated base intaglio patterns of the two-dimensional intaglio pattern (for the pair of allowed tones {Ta', Tb'}), we obtain a set of points, in the space of the shifts along each said plurality of directions, of coordinates $(\Delta_{a'},\Delta_{b'})_1$, $(\Delta_{a'}, \Delta_{b'})_2$, . . . .

(5) estimating a register error value r(a, b) for the intaglio modules corresponding to any allowed pair of tones {Ta, Tb} of all the validated base intaglio patterns of the two-dimensional intaglio pattern as: $r(a, b)=\lambda/f\ (\Delta_a^2+a_b^2)^{1/2}$, wherein $\lambda$ is a size in μm of a pixel of the digital image and f is a scale factor of the digital image. Thus, for the points $(\Delta_a,\Delta_b)_1$, $(\Delta_a,\Delta_b)_2$, . . . in the space of the shifts corresponding to the pair of allowed tones {Ta, Tb}, there are corresponding register errors $r_1(a, b)$, $r_2(a, b)$, . . . . Then, the processor decides that the two-dimensional intaglio pattern is genuine only if each register error value $r_1(a, b)$, $r_2$ (a, b), . . . , for each allowed pair of tones {Ta, Tb}, of the respective validated base intaglio patterns of the two-dimensional intaglio pattern is ≤10 μm (preferably less than or equal to 5 μm).

Figure 6D:
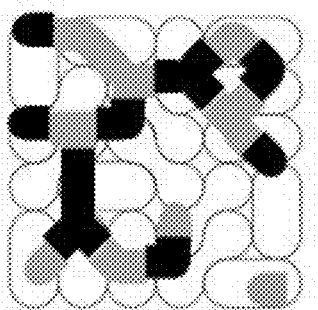
Figure 6E:
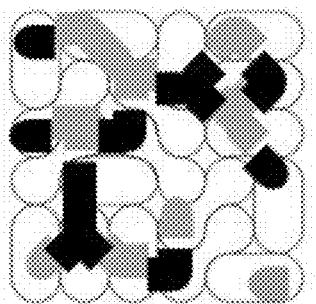
Figure 6F:
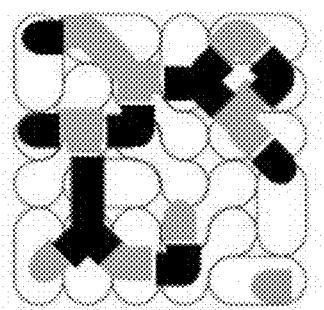
Figure 6G:
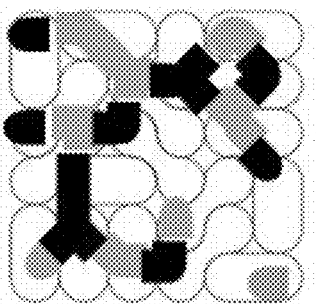

The above operations of shifting the positions on the digital image of the intaglio modules of a validated base intaglio pattern, from their initial positions at decoding stage of said base intaglio pattern to their shifted positions, in order to measure symbol by symbol resulting differences between measured printed tone values, are illustrated on FIG. 6D-E. For simplicity, only two direction of shift are considered: the vertical direction and the horizontal direction on the digital image. Starting from initial positions of the intaglio modules on the digital image (i.e. initial positions of pixels on the digital image corresponding to the detected intaglio modules at decoding stage) of the validated base intaglio pattern of FIG. 6C, a forward shift along the vertical direction of the intaglio modules corresponding to a darker tone is represented on FIG. 6D, and a backward shift along said direction of the intaglio modules corresponding to a darker tone is represented on FIG. 6E. Clearly from these two figures, the shift sum for said vertical direction (and for the intaglio modules of darker tone) having the greatest value corresponds to the backward shift represented on FIG. 6E, wherein a majority of "dark" intaglio modules better fit in position with the positions of the elements E1 (of black color) in the symbols of the validated reference pattern associated with the validated base intaglio pattern of FIG. 6C. The above forward and backward shifts (of the darker intaglio modules) are repeated but this time for the horizontal direction, as represented on respectively corresponding FIG. 6F and FIG. 6G. From these two figures, the shift sums for said horizontal direction (and for the intaglio modules of darker tone), when considering all the "dark" symbols, the respective forward and backward shifts will provide shift sums of which values are smaller than the above shift sum relating to FIG. 6E. Consequently, the best shift, for the dark intaglio modules, from the backward and forward shifts over the two directions, is the backward shift of FIG. 6E, and it is the shift corresponding to this shift sum that will be retained for calculating the global shift $\Delta_a$ for all the intaglio modules (corresponding to the darker tone) of all the validated base intaglio patterns of the two-dimensional intaglio pattern (for the allowed tone Ta), as we consider here only one base intaglio pattern (i.e. that of FIG. 6C) for simplicity.

As it is clear from the FIG. 6D-G wherein neither all the dark (black) intaglio modules nor all the light (grey) intaglio modules are in register, the result of the above detailed calculations of the global shift $\Delta_a$ (for dark tone Ta) together with a global shift $\Delta_b$ obtained from equivalent shifting operations performed on the light intaglio modules (i.e. for light tone Tb), will provide a register error value r that is greater than the threshold value of 10 µm (for this threshold value of 10 µm, or lower, no alignment defect of the intaglio modules could be visible to the naked eye on the figures). Consequently, the two-dimensional intaglio pattern of FIG. 6C will be considered as being not genuine, although it could be decoded.

The above method for estimating a register error between modules of different tones of a color works particularly well for security markings containing a great number of two-dimensional intaglio patterns, like for example on FIG. 1. This is due to the statistical basis of the method: the more symbols in the security marking, the more precision is reached for detecting a register error. For example, with the security marking of FIG. 1, a smartphone (e.g. a Samsung S10, with 12 mega pixels) having stored about 800 validated base intaglio patterns corresponding to reference patterns having each 18 symbols, it is possible to detect a register error as low as 5 µm although the smartphone has a resolving power of about 24 µm (for an image taken at about 10 cm from the marking). Consequently, a fake security marking obtained by offset printing can easily be detected, whereas it cannot be detected via naked eye, as it is not possible to realize a multitone offset printing copy of multitone intaglio lines of width between 20 µm and 50 µm wherein the different portions of intaglio lines of different tones are in perfect register. The resolving power of the camera is its ability to differentiate two lines (or points) on an image of an object, the greater the resolving power, the smaller the minimum distance between two lines or points that can still be distinguished. The larger the numerical aperture of the objective lens of the camera, the higher the resolving power.

The above disclosed subject matter is to be considered illustrative, and not restrictive, and serves to provide a better understanding of the invention defined by the independent claims.

The invention claimed is:

1. A security element comprising a substrate and a security marking, the security marking comprising a two-dimensional intaglio pattern printed on a surface of the substrate via intaglio printing with intaglio ink, the two-dimensional intaglio pattern having an associated color and comprising at least one base intaglio pattern comprising a plurality of intaglio modules, each base intaglio pattern only comprises intaglio modules of which tones belong to a corresponding set of two distinct allowed tones forming a pair of allowed tones, each intaglio module having one tone of said associated color, a tone of an intaglio module being selected from a tone palette of a plurality of distinct reference tones of the associated color, a CIE color difference $\Delta E^*$ between the tones being greater than or equal to 2.0, a width & of an intaglio module being greater than 20 µm and less than or equal to 50 µm, wherein the two-dimensional intaglio pattern is produced based on an associated two-dimensional encoded pattern comprising at least one reference pattern, wherein each of the at least one base intaglio pattern is based on an associated reference pattern of the at least one reference pattern, each base intaglio pattern and an associated reference pattern encoding a same portion of information, which specifies a unique identification number of the associated reference pattern, wherein each reference pattern includes a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2, wherein each reference pattern only comprises dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones, wherein each intaglio module of each base intaglio pattern of the two-dimensional intaglio pattern is printed either as a separate intaglio module corresponding to a first element of a symbol of an associated reference pattern of the two-dimensional encoded pattern and its location in the reference pattern; or as a portion of an intaglio line corresponding to a line connecting two first elements having a same parameter value p, respectively belonging to two distinct adjacent symbols of an associated reference pattern of the two-dimensional encoded pattern, and a location of the line in the reference pattern.

2. The security element of claim 1, comprising a plurality of two-dimensional intaglio patterns, each two-dimensional intaglio pattern having a corresponding associated color being distinct from a background color of the substrate.

3. The security element according to claim 1, wherein at least one two-dimensional intaglio pattern is comprised in a cell having a boundary formed by intaglio lines of which height is greater than any height of the intaglio modules of said two-dimensional intaglio pattern, a distance between an edge of the two-dimensional intaglio pattern and the boundary of the cell being greater than or equal to 40 µm.

4. The security element according to claim 1, wherein a CIE color difference $\Delta E^*$ between the tones is greater than or equal to 2.5.

5. An engraved plate for an intaglio printing machine, comprising grooves of variable engraving depth adapted to receive intaglio ink to print on a surface of a substrate a two-dimensional intaglio pattern of a security marking of a security element according to claim 1.

6. A method of producing a security element comprising a security marking comprising a two-dimensional intaglio pattern according to claim 1, the method comprising the steps of:

(i) generating a two-dimensional encoded pattern comprising at least one reference pattern by encoding a portion of information into each of said at least one reference pattern forming the two-dimensional encoded pattern, said portion of information specifying for each reference pattern its unique identification number, each reference pattern including a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2, wherein each reference pattern only comprises dark symbols and light symbols, the parameter value of the first element of a dark symbol corresponding to a darker tone of an associated pair of allowed tones, selected from a tone palette of a plurality of distinct reference tones of a color associated with the two-dimensional encoded pattern, and the parameter value of the first element of a light symbol corresponding to the lighter tone of said associated pair of allowed tones, wherein the two-dimensional intaglio pattern to be produced is based on the generated two-dimensional encoded pattern and comprising at least one base intaglio pattern comprising a plurality of intaglio modules, each intaglio module having one tone of said associated color, a tone of an intaglio module being selected from the tone palette; wherein each of the at least one base intaglio pattern is based on an associated reference pattern of the at least one reference pattern, each base intaglio pattern encoding a same portion of information than an associated reference pattern, wherein each base intaglio pattern only comprising intaglio modules of which tones belong to the pair of allowed tones of the associated reference pattern, and each intaglio module of each base intaglio pattern of the two-dimensional intaglio pattern is to be printed either as a separate intaglio module corresponding to a first element of a symbol of an associated reference pattern of the two-dimensional encoded pattern and its location in the reference pattern; or as a portion of an intaglio line corresponding to a line connecting two first elements having a same parameter value p, respectively belonging to two distinct adjacent symbols of an associated reference pattern of the two-dimensional encoded pattern, and a location of the line in the reference pattern;

(ii) engraving a plate of an intaglio printing machine with variable engraving depth adapted to receive an intaglio ink of said color and to reproduce the intaglio modules of the two-dimensional intaglio pattern according to the generated two-dimensional encoded pattern; and (iii) inking the plate with the intaglio ink and using the inked plate with the intaglio printing machine to print on a surface of a substrate the corresponding two-dimensional intaglio pattern.

7. A method of decoding information encoded into a two-dimensional intaglio pattern of a security marking of a security element, the two-dimensional intaglio pattern comprising at least one base intaglio pattern comprising a plurality of intaglio modules, comprising the steps of:

imaging the two-dimensional intaglio pattern;

detecting, from the imaged intaglio modules of the imaged two-dimensional intaglio pattern, any reference pattern of at least one reference pattern forming a two-dimensional encoded pattern based on which a corresponding genuine two-dimensional intaglio pattern of a genuine security marking of a genuine security element according to claim 1 was produced;

decoding each detected reference pattern and retrieving corresponding decoded information of the two-dimensional encoded pattern; and validating each decoded reference pattern and corresponding base intaglio pattern.

8. The method of claim 7, comprising the steps of:

a) imaging the two-dimensional intaglio pattern of the security marking with a camera, equipped with a processor and a memory, of which light sensor is adapted to detect a color of intaglio modules forming the genuine intaglio pattern and distinct tones of the tone palette of said color, to obtain a digital image of the two-dimensional intaglio pattern and store the obtained digital image in the memory, the memory storing a set of associated reference patterns and, for each stored reference pattern, the portion of information specifying a corresponding reference pattern identification number;

each stored reference pattern including a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2;

each pair of allowed tones of intaglio modules of each base intaglio pattern being associated with a corresponding base intaglio pattern and stored in the memory in association with the reference pattern identification number of the reference pattern associated with said base intaglio pattern;

each stored reference pattern only comprising dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones;

b) detecting in the stored digital image, via image processing of the pixels of the digital image scanned with the processor through a movable window of a size of a reference pattern, intaglio modules within the window, and b1) checking whether each of said detected intaglio modules, for a candidate reference pattern selected from the stored set of reference patterns, either is a separate intaglio module corresponding to a first element of a symbol of the candidate reference pattern and its location in the candidate reference pattern; or represents a portion of an intaglio line corresponding to a line connecting two first elements having a same parameter value p, respectively belonging to two distinct adjacent symbols of the candidate reference pattern, and a location of the line in the candidate reference pattern; and b2) in case the detected intaglio modules correspond to respective elements of the symbols of the candidate reference pattern, decoding the candidate reference pattern to obtain its candidate reference pattern identification number, thereby decoding the associated base intaglio pattern, validating the decoded candidate reference pattern and the decoded associated base intaglio pattern to obtain corresponding associated validated reference pattern and validated base intaglio pattern, and storing in the memory corresponding location data indicating a location on the digital image of the validated base intaglio pattern; and b3) in case the detected intaglio modules do not correspond to respective elements of the symbols of the candidate reference pattern, selecting a new candidate reference pattern from the stored set of reference patterns, and performing steps b1) to b2) with said new candidate reference pattern; and b4) in case the detected intaglio modules do not correspond to respective elements of the symbols of any one of the candidate reference patterns, moving the window with respect to the digital image to scan another area of the digital image and detect intaglio modules through the moved window, and performing step b1) to b3) until all the digital image is scanned through the window;

c) in case the full digital image has been scanned through the window and the detected intaglio modules do not correspond to respective elements of the symbols of any candidate reference pattern, delivering a signal indicating that the decoding of the two-dimensional intaglio pattern failed.

9. A method for authenticating a two-dimensional intaglio pattern of a security marking of a security element, comprising the steps of:

performing the operations of decoding information encoded into the two-dimensional intaglio pattern according to the method of claim 7, to obtain, from the imaged two-dimensional intaglio pattern, each base intaglio pattern of the two-dimensional intaglio pattern and corresponding validated reference pattern;

shifting along a plurality of distinct directions, with respect to initial positions corresponding to respective positions of the detected intaglio modules of each validated base intaglio pattern on the taken image of the two-dimensional intaglio pattern at decoding, for each validated base intaglio pattern, intaglio modules respectively corresponding to a tone of an allowed pair of tones from the tone palette of the color of the genuine two-dimensional intaglio pattern, to obtain corresponding shifted images of said intaglio modules;

determining for each validated base intaglio pattern, from differences between measured tone values at initial positions of the shifted intaglio modules on the respective shifted images and measured tone values at same initial positions of said intaglio modules on the image of the two-dimensional intaglio pattern at decoding, with respect to each corresponding symbol of the associated reference pattern, a pair of shift values, respectively for intaglio modules corresponding to each tone of said pair of allowed tones, providing a maximal tone value for all the intaglio modules, respectively corresponding to each tone of said pair of allowed tones, of the validated base intaglio pattern; and determining that, for that allowed pair of tones, the respective intaglio modules of the two-dimensional intaglio pattern are in register only if a norm value of an average of the determined pairs of shift values, over all the validated base intaglio patterns of the two-dimensional intaglio pattern, is less than or equal to 10 μm.

10. The method according to claim 9, comprising the steps of:

A) performing operations a), b), b1), b2) b3), b4) and -c) of the method of decoding information encoded in a two-dimensional intaglio pattern comprising the steps of:

a) imaging the two-dimensional intaglio pattern of the security marking with a camera, equipped with a processor and a memory, of which light sensor is adapted to detect a color of intaglio modules forming the genuine intaglio pattern and distinct tones of the tone palette of said color, to obtain a digital image of the two-dimensional intaglio pattern and store the obtained digital image in the memory, the memory storing a set of associated reference patterns and, for each stored reference pattern, the portion of information specifying a corresponding reference pattern identification number;

each stored reference pattern including a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter $p(E)$, the parameter of the first element E1 having a positive value different from a zero value of the parameter of the second element E2;

each pair of allowed tones of intaglio modules of each base intaglio pattern being associated with a corresponding base intaglio pattern and stored in the memory in association with the reference pattern identification number of the reference pattern associated with said base intaglio pattern;

each stored reference pattern only comprising dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones;

b) detecting in the stored digital image, via image processing of the pixels of the digital image scanned with the processor through a movable window of a size of a reference pattern, intaglio modules within the window, and b1) checking whether each of said detected intaglio modules, for a candidate reference pattern selected from the stored set of reference patterns, either is a separate intaglio module corresponding to a first element of a symbol of the candidate reference pattern and its location in the candidate reference pattern; or represents a portion of an intaglio line corresponding to a line connecting two first elements having a same parameter value p, respectively belonging to two distinct adjacent symbols of the candidate reference pattern, and a location of the line in the candidate reference pattern; and b2) in case the detected intaglio modules correspond to respective elements of the symbols of the candidate reference pattern, decoding the candidate reference pattern to obtain its candidate reference pattern identification number, thereby decoding the associated base intaglio pattern, validating the decoded candidate reference pattern and the decoded associated base intaglio pattern to obtain corresponding associated validated reference pattern and validated base intaglio pattern, and storing in the memory corresponding location data indicating a location on the digital image of the validated base intaglio pattern; and b3) in case the detected intaglio modules do not correspond to respective elements of the symbols of the candidate reference pattern, selecting a new candidate reference pattern from the stored set of reference patterns, and performing steps b1) to b2) with said new candidate reference pattern; and b4) in case the detected intaglio modules do not correspond to respective elements of the symbols of any one of the candidate reference patterns, moving the window with respect to the digital image to scan another area of the digital image and detect intaglio modules through the moved window, and performing step b1) to b3) until all the digital image is scanned through the window;

c) in case the full digital image has been scanned through the window and the detected intaglio modules do not correspond to respective elements of the symbols of any candidate reference pattern, delivering a signal indicating that the decoding of the two-dimensional intaglio pattern failed, on the two-dimensional intaglio pattern to be authenticated;

B) in case in step A) the decoding of the two-dimensional intaglio pattern fails, delivering an information indicating that the decoding of the two-dimensional intaglio pattern failed;

C) in case the step A) provides the information encoded in the two-dimensional intaglio pattern indicating, for each stored location on the digital image of a validated base intaglio pattern, the reference pattern identification number of the associated validated reference pattern, verifying a multitone aspect of the validated base intaglio patterns by determining, from their respective associated validated reference pattern identification numbers, their allowed pair of distinct tones Ta, Tb;

measuring on the digital image a printed tone value of each intaglio module of the validated base intaglio patterns, determining a dynamic range of the digital image from the measured tone values;

calculating an average printed tone value Ta of the intaglio modules of the validated base intaglio patterns corresponding to the allowed tone Ta as an average of the measured printed tone values of the intaglio modules corresponding to the allowed tone Ta, and an average printed tone value Tb of the intaglio modules of the validated base intaglio patterns corresponding to the allowed tone Tb as an average of the measured printed tone values of the intaglio modules corresponding to the allowed tone Tb;

checking, for each allowed pair of tones Ta, Tb, whether a multitone criterion that a difference between the calculated average printed tone values Ta and Tb is greater than 1% of the dynamic range is met; and in case the multitone criterion is met for each allowed pair of tones, deciding that the two-dimensional intaglio pattern has said multitone aspect, or in case the multitone criterion is not satisfied for an allowed pair of tones Ta, Tb, deciding that the two-dimensional intaglio pattern does not have said multitone aspect and is not genuine;

D) in case the two-dimensional intaglio pattern has the multitone aspect, for each validated base intaglio pattern having a corresponding pair of allowed tones Ta, Tb, of which location in the digital image is stored in the memory, performing with the processor the operations of:

D1) measuring within the window disposed at said location on the digital image, through a sampling grid having an arrangement of symbols with respective sites of their two-dimensional elements E1 and E2 corresponding to the symbols of the validated reference pattern associated with said validated base intaglio pattern, printed tone values of the intaglio modules of the validated base intaglio pattern from pixels of the digital image located within the respective sites of elements E1 and E2 of each symbol of the sampling grid to obtain corresponding initial tone values attributed to the respective elements E1 and E2 of the symbols of the validated reference pattern associated with the validated base intaglio pattern, calculating for each symbol of the sampling grid a difference between the initial tone value attributed to the element E1 and the initial tone value attributed to the element E2 to obtain an initial differential symbol tone value and storing in the memory the obtained initial differential symbol tone values attributed to the elements of the symbols of the validated reference pattern, and, for each one of the two allowed tones Ta, Tb of the validated reference pattern, a corresponding zero-shift sum is obtained by summing the initial differential symbol tone values for the all the symbols of the validated reference pattern corresponding, respectively, to the tone Ta and the tone Tb, and the obtained zero-shift sum for the allowed tone Ta and zero-shift sum for the allowed tone Tb are stored in the memory;

D2) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Ta to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Ta, from shifted pixels of the digital image located within the respective sites of elements E1 and E2 of each symbol of the sampling grid of which first element corresponds to the allowed tone Ta, and storing in the memory the obtained shifted tone values;

calculating, for each shift, for each symbol of the sampling grid of which first element corresponds to the allowed tone Ta, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Ta;

for each shift, summing the calculated shifted differential symbol tone values of all the symbols of the sampling grid corresponding to the allowed tone Ta, to obtain corresponding validated reference pattern shift sum for the allowed tone Ta; and selecting a best shift, for the allowed tone Ta, corresponding to the greatest calculated shift sum among the calculated shift sums and the zero-shift sum, for the validated reference pattern;

calculating a global shift $\Delta_a$ for the two-dimensional intaglio pattern by determining an average of all the selected best shifts, for the allowed tone Ta, over the validated reference patterns associated with the respective validated base intaglio patterns of the two-dimensional intaglio pattern having the corresponding pair of allowed tones Ta, Tb;

D3) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Tb to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Tb, from shifted pixels of the digital image located within the respective sites of elements E1 and E2 of each symbol of the sampling grid of which first element corresponds to the allowed tone Tb, and storing in the memory the obtained shifted tone values;

calculating, for each shift, for each symbol of the sampling grid of which first element corresponds to the allowed tone Tb, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Tb;

for each shift, summing the calculated shifted differential symbol tone values of all the symbols of the sampling grid corresponding to the allowed tone Tb, to obtain corresponding validated reference pattern shift sum for the allowed tone Tb; and selecting a best shift, for the allowed tone Tb, corresponding to the greatest calculated shift sum among the calculated shift sums and the zero-shift sum, for the validated reference pattern;

calculating a global shift $\Delta_b$ for the two-dimensional intaglio pattern by determining an average of all the selected best shifts, for the allowed tone Tb, over the validated reference patterns associated with the respective validated base intaglio patterns of the two-dimensional intaglio pattern having the corresponding pair of allowed tones Ta, Tb;

D4) performing the above operations D) for each remaining pair of allowed tones Ta', Tb' from the pairs of allowed tones of the stored validated base intaglio patterns of the two-dimensional intaglio pattern, to obtain corresponding pairs of global shifts ($\Delta_a'$, $\Delta_b'$), and storing in the memory said pairs of global shifts;

E) estimating a register error value r(a, b) for the intaglio modules corresponding to any allowed pair of tones Ta, Tb of all the validated base intaglio patterns of the two-dimensional intaglio pattern as r(a, b)=$\lambda$/f ($A_a^2$+ $\Delta_b^2$)$^{1/2}$, wherein $\lambda$ is a size in $\mu$m of a pixel of the digital image and f is a scale factor of the digital image, and deciding that the two-dimensional intaglio pattern is genuine if each register error value r(a, b) for each allowed pair of tones Ta, Tb of the respective validated base intaglio patterns of the two-dimensional intaglio pattern is less than or equal to 10 $\mu$m.

11. A device for decoding information encoded into a two-dimensional intaglio pattern of a security marking of a security element, the two-dimensional intaglio pattern comprising at least one base intaglio pattern comprising a plurality of intaglio modules, the device comprising a camera, equipped with a processor, a memory, a light sensor adapted to detect a color of a genuine intaglio pattern and distinct tones from a tone palette of said color, the genuine two-dimensional intaglio pattern of a genuine security marking of a genuine security element being according to claim 1, the processor being adapted to perform image processing of a digital image of the genuine two-dimensional intaglio pattern taken by the camera and stored in the memory and perform decoding operations on encoded information detected on the digital image, the memory storing at least one reference pattern forming a two-dimensional encoded pattern on the basis of which the genuine two-dimensional intaglio pattern was produced, the device being adapted to perform the operations of:

imaging the two-dimensional intaglio pattern;

detecting, from the imaged intaglio modules of the imaged two-dimensional intaglio pattern, any reference pattern of the at least one reference pattern of the two-dimensional encoded pattern on the basis of which the associated genuine two-dimensional intaglio pattern was produced;

decoding each detected reference pattern and retrieving corresponding decoded information of the two-dimensional encoded pattern; and validating each decoded reference pattern and corresponding base intaglio pattern.

12. The device of claim 11, wherein each stored reference pattern includes a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2;

each pair of allowed tones of intaglio modules of each base intaglio pattern being associated with the base intaglio pattern and stored in the memory in association with the reference pattern identification number of the reference pattern associated with said base intaglio pattern;

each stored reference pattern only comprises dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones;

the device being adapted to perform the operations of:

a) imaging the two-dimensional intaglio pattern of the security marking with the camera to obtain a digital image of the two-dimensional intaglio pattern and store the obtained digital image in the memory;

b) detecting in the stored digital image intaglio modules within a movable window of a size of an allowed reference pattern, via image processing of the pixels of the digital image scanned with the processor through the window; and b1) checking whether each of said detected intaglio modules, for a candidate reference pattern selected from the set of reference patterns, either is a separate intaglio module corresponding to a first element of a symbol of the candidate reference pattern and its location in the candidate reference pattern; or represents a portion of an intaglio line corresponding to a line connecting two first elements having a same parameter value p, respectively belonging to two distinct adjacent symbols of the candidate reference pattern, and a location of the line in the candidate reference pattern; and b2) in case the detected intaglio modules correspond to respective elements of the symbols of the candidate reference pattern, decoding the candidate reference pattern to obtain its candidate reference pattern identification number, thereby decoding the associated base intaglio pattern, validating the decoded candidate reference pattern and the decoded associated base intaglio pattern to obtain corresponding associated validated reference pattern and validated base intaglio pattern, and storing in the memory corresponding location data indicating a location on the digital image of the validated base intaglio pattern; and b3) in case the detected intaglio modules do not correspond to respective elements of the symbols of the candidate reference pattern, selecting a new candidate reference pattern from the stored set of reference patterns, and performing steps b1) to b2) with said new candidate reference pattern; and b4) in case the detected intaglio modules do not correspond to respective elements of the symbols of any one of the candidate reference patterns, moving the window with respect to the digital image to scan another area of the digital image and detect intaglio modules through the moved window, and performing step b1) to b3) until all the digital image is scanned through the window;

c) in case the full digital image has been scanned through the window and the detected intaglio modules do not correspond to respective elements of the symbols of any candidate reference pattern, delivering a signal indicating that the decoding of the two-dimensional intaglio pattern failed.

13. A device for authenticating a two-dimensional intaglio pattern of a security marking of a security element, a genuine two-dimensional intaglio pattern of a genuine security marking of a genuine security element being according to claim 1, comprising a camera, equipped with a processor, a memory, a light sensor adapted to detect a color of a genuine intaglio pattern and distinct tones of a tone palette of said color, the processor being adapted to perform image processing of a digital image of the genuine two-dimensional intaglio pattern taken by the camera and stored in the memory and perform decoding operations on encoded information detected on the digital image, the memory storing at least one reference pattern forming a two-dimensional encoded pattern based on which the genuine two-dimensional intaglio pattern was produced, the device being adapted to perform the operations of:

decoding information encoded into the two-dimensional intaglio pattern, the two-dimensional intaglio pattern comprising at least one base intaglio pattern comprising a plurality of intaglio modules, according to a method, comprising the steps of:

imaging the two-dimensional intaglio pattern;

detecting, from the imaged intaglio modules of the imaged two-dimensional intaglio pattern, any reference pattern of at least one reference pattern forming a two-dimensional encoded pattern based on which a corresponding genuine two-dimensional intaglio pattern of a genuine security marking of a genuine security element according to claim 1 was produced;

decoding each detected reference pattern and retrieving corresponding decoded information of the two-dimensional encoded pattern; and validating each decoded reference pattern and corresponding base intaglio pattern, to obtain, from the image taken by the camera of the two-dimensional intaglio pattern, each validated base intaglio pattern of the two-dimensional intaglio pattern and corresponding validated reference pattern;

shifting along a plurality of distinct directions, with respect to initial positions corresponding to respective positions of the detected intaglio modules of each validated base intaglio pattern on the taken image of the two-dimensional intaglio pattern, for each validated base intaglio pattern, intaglio modules respectively corresponding to a tone of an allowed pair of tones from the tone palette of the color of the genuine two-dimensional intaglio pattern, to obtain corresponding shifted images of said intaglio modules;

determining for each validated base intaglio pattern, from differences between measured tone values at initial positions of the shifted intaglio modules on the respective shifted images and measured tone values at same initial positions of said intaglio modules on the image of the two-dimensional intaglio pattern at decoding, with respect to each corresponding symbol of the associated reference pattern, a pair of shift values, respectively for intaglio modules corresponding to each tone of said pair of allowed tones, providing a maximal tone value for all the intaglio modules, respectively corresponding to each tone of said pair of allowed tones, of the validated base intaglio pattern; and determining that, for that allowed pair of tones, the respective intaglio modules of the two-dimensional intaglio pattern are in register only if a norm value of an average of the determined pairs of shift values, over all the validated base intaglio patterns of the two-dimensional intaglio pattern, is less than or equal to 10 µm.

14. The device of claim 13, adapted to:

A) perform operations a), b), b1), b2) b3), b4) and -c) of the method of decoding with the processor information encoded in a two-dimensional intaglio pattern comprising the steps of:

a) imaging the two-dimensional intaglio pattern of the security marking with a camera, equipped with a processor and a memory, of which light sensor is adapted to detect a color of intaglio modules forming the genuine intaglio pattern and distinct tones of the tone palette of said color, to obtain a digital image of the two-dimensional intaglio pattern and store the obtained digital image in the memory, the memory storing a set of associated reference patterns and, for each stored reference pattern, the portion of information specifying a corresponding reference pattern identification number;

each stored reference pattern including a specific arrangement of a plurality of symbols, each symbol in the arrangement allowing to encode data according to a state of said symbol, the state of each symbol consisting in a specific arrangement of a first two-dimensional element E1 and a second distinct two-dimensional element E2 within the symbol, each element E having a corresponding value of a parameter p(E), the parameter of the first element E1 having a positive value different from a zero value of the parameter of the second element E2;

each pair of allowed tones of intaglio modules of each base intaglio pattern being associated with a corresponding base intaglio pattern and stored in the memory in association with the reference pattern identification number of the reference pattern associated with said base intaglio pattern;

each stored reference pattern only comprising dark symbols and light symbols, the parameter value of the first element of a dark symbol corresponding to the darker tone of the pair of allowed tones of an associated base intaglio pattern, and the parameter value of the first element of a light symbol corresponding to the lighter tone of said associated pair of allowed tones;

b) detecting in the stored digital image, via image processing of the pixels of the digital image scanned with the processor through a movable window of a size of a reference pattern, intaglio modules within the window, and b1) checking whether each of said detected intaglio modules, for a candidate reference pattern selected from the stored set of reference patterns, either is a separate intaglio module corresponding to a first element of a symbol of the candidate reference pattern and its location in the candidate reference pattern; or represents a portion of an intaglio line corresponding to a line connecting two first elements having a same parameter value p, respectively belonging to two distinct adjacent symbols of the candidate reference pattern, and a location of the line in the candidate reference pattern; and b2) in case the detected intaglio modules correspond to respective elements of the symbols of the candidate reference pattern, decoding the candidate reference pattern to obtain its candidate reference pattern identification number, thereby decoding the associated base intaglio pattern, validating the decoded candidate reference pattern and the decoded associated base intaglio pattern to obtain corresponding associated validated reference pattern and validated base intaglio pattern, and storing in the memory corresponding location data indicating a location on the digital image of the validated base intaglio pattern; and b3) in case the detected intaglio modules do not correspond to respective elements of the symbols of the candidate reference pattern, selecting a new candidate reference pattern from the stored set of reference patterns, and performing steps b1) to b2) with said new candidate reference pattern; and b4) in case the detected intaglio modules do not correspond to respective elements of the symbols of any one of the candidate reference patterns, moving the window with respect to the digital image to scan another area of the digital image and detect intaglio modules through the moved window, and performing step b1) to b3) until all the digital image is scanned through the window;

c) in case the full digital image has been scanned through the window and the detected intaglio modules do not correspond to respective elements of the symbols of any candidate reference pattern, delivering a signal indicating that the decoding of the two-dimensional intaglio pattern failed, on the two-dimensional intaglio pattern to be authenticated;

B) in case in step A) the decoding of the two-dimensional intaglio pattern fails, delivering an information indicating that the decoding of the two-dimensional intaglio pattern failed;

C) in case the step A) provides the information encoded in the two-dimensional intaglio pattern indicating, for each stored location on the digital image of a validated base intaglio pattern, the reference pattern identification number of the associated validated reference pattern, verifying a multitone aspect of the validated base intaglio patterns by determining, from their respective associated validated reference pattern identification numbers, their allowed pair of distinct tones Ta, Tb;

measuring on the digital image a printed tone value of each intaglio module of the validated base intaglio patterns, determining a dynamic range of the digital image from the measured tone values;

calculating an average printed tone value Ta of the intaglio modules of the validated base intaglio patterns corresponding to the allowed tone Ta as an average of the measured printed tone values of the intaglio modules corresponding to the allowed tone Ta, and an average printed tone value Tb of the intaglio modules of the validated base intaglio patterns corresponding to the allowed tone Tb as an average of the measured printed tone values of the intaglio modules corresponding to the allowed tone Tb;

checking, for each allowed pair of tones Ta, Tb, whether a multitone criterion that a difference between the calculated average printed tone values Ta and Tb is greater than 1% of the dynamic range is met; and in case the multitone criterion is met for each allowed pair of tones, deciding that the two-dimensional intaglio pattern has said multitone aspect, or in case the multitone criterion is not satisfied for an allowed pair of tones Ta, Tb, deciding that the two-dimensional intaglio pattern does not have said multitone aspect and is not genuine;

D) in case the two-dimensional intaglio pattern has the multitone aspect, for each validated base intaglio pattern having a corresponding pair of allowed tones Ta, Tb, of which location in the digital image is stored in the memory, performing with the processor the operations of:

D1) measuring within the window disposed at said location on the digital image, through a sampling grid having an arrangement of symbols with respective sites of their two-dimensional elements E1 and E2 corresponding to the symbols of the validated reference pattern associated with said validated base intaglio pattern, printed tone values of the intaglio modules of the validated base intaglio pattern from pixels of the digital image located within the respective sites of elements E1 and E2 of each symbol of the sampling grid to obtain corresponding initial tone values attributed to the respective elements E1 and E2 of the symbols of the validated reference pattern associated with the validated base intaglio pattern, calculating for each symbol of the sampling grid a difference between the initial tone value attributed to the element E1 and the initial tone value attributed to the element E2 to obtain an initial differential symbol tone value, and storing in the memory the obtained initial differential symbol tone values attributed to the elements of the symbols of the validated reference pattern, and, for each one of the two allowed tones Ta, Tb of the validated reference pattern, a corresponding zero-shift sum is obtained by summing the initial differential symbol tone values for the all the symbols of the validated reference pattern corresponding, respectively, to the tone Ta and the tone Tb, and the obtained zero-shift sum for the allowed tone Ta and zero-shift sum for the allowed tone Tb are stored in the memory;

D2) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Ta to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Ta, from shifted pixels of the digital image located within the respective sites of elements E1 and E2 of each symbol of the sampling grid of which first element corresponds to the allowed tone Ta, and storing in the memory the obtained shifted tone values;

calculating, for each shift, for each symbol of the sampling grid of which first element corresponds to the allowed tone Ta, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Ta;

for each shift, summing the calculated shifted differential symbol tone values of all the symbols of the sampling grid corresponding to the allowed tone Ta, to obtain corresponding validated reference pattern shift sum for the allowed tone Ta; and selecting a best shift, for the allowed tone Ta, corresponding to the greatest calculated shift sum among the calculated shift sums and the calculated zero-shift sum, for the validated reference pattern;

calculating a global shift $\Delta_a$ for the two-dimensional intaglio pattern by determining an average of all the selected best shifts, for the allowed tone Ta, over the validated reference patterns associated with the respective validated base intaglio patterns of the two-dimensional intaglio pattern having the corresponding pair of allowed tones Ta, Tb;

D3) shifting by at least one pixel size, backward and forward along each of said plurality of distinct directions with respect to the digital image, the pixels of the digital image located within the respective sites of elements E1 and E2 of each symbol of the sampling grid of which first element corresponds to the allowed tone Tb to obtain corresponding shifted pixels having shifted positions with respect to the sampling grid;

measuring through the sampling grid, respectively for the backward shift and the forward shift along each direction, corresponding backward shifted and forward shifted tone values attributed to the respective elements E1 and E2 of the symbols of the sampling grid of which first element corresponds to the allowed tone Tb, from shifted pixels of the digital image located within the respective sites of elements E1 and E2 of each symbol of the sampling grid of which first element corresponds to the allowed tone Tb, and storing in the memory the obtained shifted tone values;

calculating, for each shift, for each symbol of the sampling grid of which first element corresponds to the allowed tone Tb, a difference between the shifted tone value attributed to the element E1 and the shifted tone value attributed to the element E2 to obtain corresponding shifted differential symbol tone values, and storing in the memory the obtained shifted differential symbol tone values attributed to the elements of the symbols of the validated reference pattern of which first element corresponds to the allowed tone Tb;

for each shift, summing the calculated shifted differential symbol tone values of all the symbols of the sampling grid corresponding to the allowed tone Tb, to obtain corresponding validated reference pattern shift sum for the allowed tone Tb; and selecting a best shift, for the allowed tone Tb, corresponding to the greatest calculated shift sum among the calculated shift sums and the zero-shift sum, for the validated reference pattern;

calculating a global shift $\Delta_b$ for the two-dimensional intaglio pattern by determining an average of all the selected best shifts, for the allowed tone Tb, over the validated reference patterns associated with the respective validated base intaglio patterns of the two-dimensional intaglio pattern having the corresponding pair of allowed tones Ta, Tb;

D4) performing the above operations D) for each remaining pair of allowed tones Ta', Tb' from the pairs of allowed tones of the stored validated base intaglio patterns of the two-dimensional intaglio pattern, to obtain corresponding pairs of global shifts ($\Delta_a'$, $\Delta_b'$), and storing in the memory said pairs of global shifts;

E) estimating a register error value r(a, b) for the intaglio modules corresponding to any allowed pair of tones Ta, Tb of all the validated base intaglio patterns of the two-dimensional intaglio pattern as r(a, b)=$\lambda$/f ($\Delta_a^2$+ $\Delta_b^2$)$^{1/2}$, wherein $\lambda$ is a size in μm of a pixel of the digital image and f is a scale factor of the digital image, and deciding that the two-dimensional intaglio pattern is genuine if each register error value r(a, b) for each allowed pair of tones Ta, Tb of the respective validated base intaglio patterns of the two-dimensional intaglio pattern is less than or equal to 10 μm.

15. The device of claim 13, being a smartphone wherein the light sensor is a RGB light sensor, the camera has a resolving power of at least 20 μm, and wherein measuring a tone of an intaglio module of the two-dimensional intaglio pattern illuminated with an illumination light is performed by summing the respective Red, Green and Blue light intensity components detected with the RBG light sensor from received light reflected by said intaglio module.

* * * * *